(12) United States Patent
Seguchi et al.

(10) Patent No.: US 10,727,773 B2
(45) Date of Patent: Jul. 28, 2020

(54) FIELD WINDING TYPE ROTATING ELECTRIC MACHINE

(71) Applicant: DENSO CORPORATION, Kariya, Aichi-pref. (JP)

(72) Inventors: Masahiro Seguchi, Kariya (JP); Junichi Nakazono, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/448,519

(22) Filed: Jun. 21, 2019

(65) Prior Publication Data

US 2019/0312539 A1 Oct. 10, 2019

Related U.S. Application Data

(63) Continuation of application No. PCT/JP2017/045685, filed on Dec. 20, 2017.

(30) Foreign Application Priority Data

Dec. 21, 2016 (JP) ................................. 2016-248515
Oct. 6, 2017 (JP) ................................. 2017-195878

(51) Int. Cl.
*H02P 25/098* (2016.01)
*H02P 6/32* (2016.01)
*H02K 19/12* (2006.01)

(52) U.S. Cl.
CPC ........... *H02P 25/098* (2016.02); *H02K 19/12* (2013.01); *H02P 6/32* (2016.02)

(58) Field of Classification Search
CPC ...... H02K 19/12; H02K 19/16; H02P 25/098; H02P 6/32
See application file for complete search history.

(56) References Cited

U.S. PATENT DOCUMENTS

| | | | | |
|---|---|---|---|---|
| 4,808,868 | A * | 2/1989 | Roberts | H02K 3/16 310/184 |
| 5,621,296 | A * | 4/1997 | Werner | H02P 1/26 318/768 |
| 7,411,363 | B2 * | 8/2008 | Lam | H02K 53/00 318/130 |

(Continued)

FOREIGN PATENT DOCUMENTS

| JP | 2014-7837 A | 1/2014 |
|---|---|---|
| JP | 2016-178831 A | 10/2016 |

*Primary Examiner* — Thai T Dinh
(74) *Attorney, Agent, or Firm* — Oliff PLC

(57) ABSTRACT

A field winding type rotating electric machine includes: a stator armature winding wound on a stator core; a rotor field winding wound on a rotor core; a rectifying element connected to both ends of the rotor field winding; a capacitor having one end connected to one end of the rectifying element and the other end connected between the two ends of the rotor field winding; and a control circuit configured to supply electric current, which includes a fundamental component for generating rotational torque and a harmonic component having a shorter period than the fundamental component and superimposed on the fundamental component, to the stator armature winding and thereby induce excitation current in the rotor field winding. Moreover, an inductance of the rotor field winding and a capacitance of the capacitor are in a resonant relationship with a frequency of the harmonic component.

17 Claims, 14 Drawing Sheets

(56) References Cited

U.S. PATENT DOCUMENTS

| | | |
|---|---|---|
| 2006/0290316 A1 | 12/2006 | Seguchi et al. |
| 2008/0079375 A1 | 4/2008 | Seguchi |
| 2008/0103632 A1* | 5/2008 | Saban .................. H02K 3/28 |
| | | 700/286 |
| 2016/0336891 A1* | 11/2016 | Seguchi .................. H02P 25/03 |

* cited by examiner

| | REVOLUTIONS PER MINUTE (rpm) | FUNDAMENTAL-WAVE PERIOD | TARGET NUMBER OF PULSES | ACTUAL NUMBER OF PULSES | DEVIATION RATE BETWEEN ACTUAL FREQUENCY AND RESONANCE FREQUENCY |
|---|---|---|---|---|---|
| LOW ROTATION | 10 | 1.5 | 3600 | 3600 | 1.00 |
| ↓ | 100 | 0.15 | 360 | 360 | 1.00 |
| | 500 | 0.03 | 72 | 72 | 1.00 |
| | 1500 | 0.01 | 24 | 24 | 1.00 |
| | 2000 | 0.0075 | 18 | 18 | 1.00 |
| | 2500 | 0.006 | 14.4 | 15 | 1.04 |
| | 3000 | 0.005 | 12 | 12 | 1.00 |
| ↑ | 3500 | 0.00429 | 10.3 | 10 | 0.97 |
| MEDIUM ROTATION | 4000 | 0.00375 | 9 | 9 | 1.00 |
| ↓ | 5000 | 0.003 | 7.2 | 6 | 0.83 |
| | 6000 | 0.0025 | 6 | 6 | 1.00 |
| ↑ | 7000 | 0.00214 | 5.1 | 6 | 1.17 |
| HIGH ROTATION | 8000 | 0.00188 | 4.5 | 6 | 1.33 |
| ↓ | 9000 | 0.00167 | 4 | 3 | 0.75 |
| | 10000 | 0.0015 | 3.6 | 3 | 0.83 |
| ↑ | 12000 | 0.00125 | 3 | 3 | 1.00 |
| MAXIMUM ROTATION | 15000 | 0.001 | 2.4 | 3 | 1.25 |

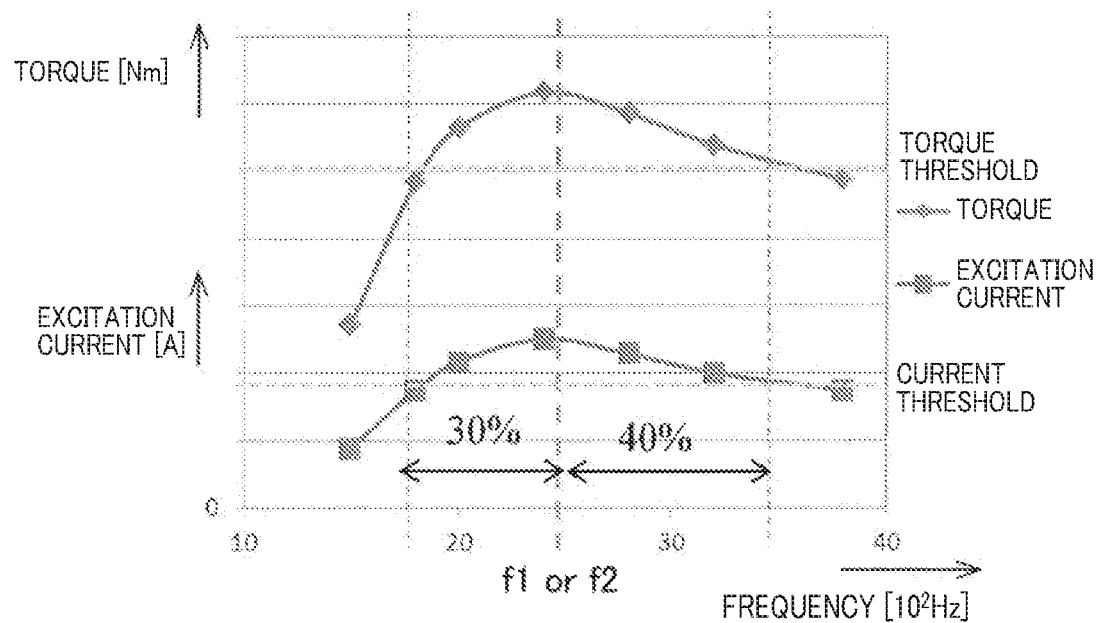

| | REVOLUTIONS PER MINUTE (rpm) | FUNDAMENTAL-WAVE PERIOD | TARGET NUMBER OF PULSES | ACTUAL NUMBER OF PULSES | DEVIATION RATE BETWEEN ACTUAL FREQUENCY AND RESONANCE FREQUENCY |
|---|---|---|---|---|---|
| LOW ROTATION | 10 | 1.5 | 3600 | 3600 | 1.00 |
| ↓ | 100 | 0.15 | 360 | 360 | 1.00 |
| | 500 | 0.03 | 72 | 72 | 1.00 |
| | 1500 | 0.01 | 24 | 24 | 1.00 |
| | 2000 | 0.0075 | 18 | 18 | 1.00 |
| | 2500 | 0.006 | 14.4 | 15 | 1.04 |
| | 3000 | 0.005 | 12 | 12 | 1.00 |
| ↑ | 3500 | 0.00429 | 10.3 | 10 | 0.97 |
| MEDIUM ROTATION | 4000 | 0.00375 | 9 | 9 | 1.00 |
| ↓ | 5000 | 0.003 | 7.2 | 6 | 0.83 |
| | 6000 | 0.0025 | 6 | 6 | 1.00 |
| ↑ | 7000 | 0.00214 | 5.1 | 6 | 1.17 |
| HIGH ROTATION | 8000 | 0.00188 | 4.5 | 4 | 0.89 |
| ↓ | 9000 | 0.00167 | 4 | 4 | 1.00 |
| | 10000 | 0.0015 | 3.6 | 4 | 1.11 |
| ↑ | 12000 | 0.00125 | 3 | 3 | 1.00 |
| MAXIMUM ROTATION | 15000 | 0.001 | 2.4 | 3 | 1.25 |

FIELD WINDING TYPE ROTATING ELECTRIC MACHINE

CROSS-REFERENCE TO RELATED APPLICATIONS

The present application is a continuation application of International Application No. PCT/JP2017/045685 filed on Dec. 20, 2017, which is based on and claims priority from Japanese Patent Applications No. 2016-248515 filed on Dec. 21, 2016 and No. 2017-195878 filed on Oct. 6, 2017. The contents of these applications are hereby incorporated by reference in their entirety into the present application.

BACKGROUND

1 Technical Field

The present disclosure relates to field winding type rotating electric machines.

2 Description of Related Art

Conventionally, field winding type rotating electric machines have been known which create magnetic fields through energization of a stator armature winding (see, for example, Patent Document 1 and Patent Document 2). These field winding type rotating electric machines include a stator and a rotor. The stator includes a stator core and the stator armature winding wound on the stator core. The rotor includes a rotor core and a rotor field winding wound on the rotor core. The rotor field winding is short-circuited via a diode which is a rectifying element. That is, the diode is connected to both ends of the rotor field winding.

Moreover, the above-described field winding type rotating electric machines further include an inverter circuit connected with the stator armature winding and a control circuit that controls the inverter circuit to supply electric currents, which depend on the rotational position of the rotor, to the stator armature winding. Each of the electric currents flowing in the stator armature winding is the sum of fundamental current (i.e., synchronous current), which is a current component for generating rotational torque, and excitation current that is a current component for the rotor excitation. The excitation current for the rotor excitation is harmonic current having a shorter period (or higher frequency) than the fundamental current; the excitation current has a pulsed waveform. Upon the excitation current for the rotor excitation being supplied to the stator armature winding, excitation magnetic flux crosses main magnetic poles of the rotor core, causing a voltage to be generated in the rotor field winding and thereby inducing excitation current.

As described above, to both the ends of the rotor field winding, there is connected the diode. Therefore, electric current flows only in one direction in the rotor field winding even when the excitation magnetic flux fluctuates to cause an AC voltage to be generated in the rotor field winding. The rotor core is excited in a predetermined direction to form field poles (specifically, N poles and S poles). The field flux for forming the field poles is generated by supply of the excitation current for the rotor excitation to the stator armature winding and rectification of the electric current flowing in the rotor field winding.

As above, in the rotating electric machines where the field poles are formed by having the excitation magnetic flux from the stator received by the rotor field winding and rectifying through the diode the electric current flowing in the rotor field winding, to generate rotational torque, the rotor core is excited by causing the excitation magnetic flux to cross the main magnetic poles of the rotor core. The excitation of the rotor core is realized by superimposing the pulsed excitation current on the fundamental current and thereby inducing excitation current in the rotor field winding.

SUMMARY

According to the present disclosure, a field winding type rotating electric machine includes: a stator armature winding wound on a stator core; a rotor field winding wound on a rotor core; a rectifying element connected to both ends of the rotor field winding; a capacitor having one end connected to one end of the rectifying element and the other end connected between the two ends of the rotor field winding; and a control circuit configured to supply electric current, which includes a fundamental component for generating rotational torque and a harmonic component having a shorter period than the fundamental component and superimposed on the fundamental component, to the stator armature winding and thereby induce excitation current in the rotor field winding. Moreover, an inductance of the rotor field winding and a capacitance of the capacitor are in a resonant relationship with a frequency of the harmonic component.

BRIEF DESCRIPTION OF THE DRAWINGS

FIG. 14 is a diagram illustrating the relationship between the frequency of the harmonic components in the vicinity of the resonance frequency and the resultant excitation current and torque in the field winding type rotating electric machine according to the first embodiment.

FIG. 15 is a table showing the combinations of two adjacent phases to which pairs of positive and negative voltage pulses are applied to generate the harmonic components and the application timings thereof (rotor positions) in the field winding type rotating electric machine according to the first embodiment.

DESCRIPTION OF EMBODIMENTS

Figure 1:
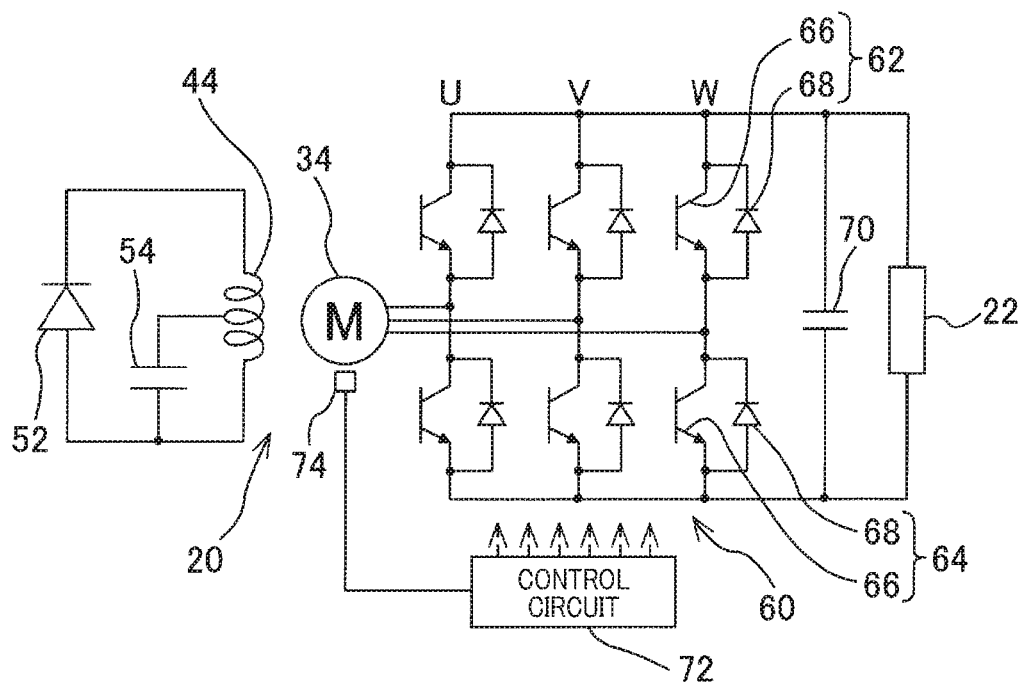
FIG. 1 is a circuit diagram of a system which includes a field winding type rotating electric machine according to a first embodiment.

In the above-described conventional field winding type rotating electric machines (see, for example, Japanese Patent Application Publications No. JP2008178211A and No. JP2007185082A), the rotor field winding has an inductance; sections of the rotor field winding on each pole form partial inductances. The magnetic flux flowing to the field poles includes leakage magnetic flux and harmonic magnetic flux. If the impedance of the rotor field winding during the excitation is high, it is difficult for electric current to flow through the rotor field winding. In this case, to suitably induce the excitation current in the rotor field winding, it is necessary to increase the amplitude of harmonic components for the rotor excitation by an amount corresponding to the difficulty of electric current in flowing through the rotor field winding. Consequently, torque ripple is increased due to the harmonic components.

In contrast, in the above-described field winding type rotating electric machine according to the present disclosure, when the electric current, which is obtained by superimposing the harmonic component on the fundamental component, is supplied to the stator armature winding, it is easy for the field current induced in the rotor field winding to flow. Consequently, it becomes possible to lower the impedance of the rotor field winding during the excitation, thereby reducing torque ripple caused by the harmonic component for the rotor excitation.

In a further implementation, the harmonic component is adjusted in amplitude with its envelope represented by a standing wave whose period is ½ of a period of the fundamental component. With this configuration, it is possible to control the amount of the excitation current for exciting the rotor field winding by adjusting the amplitude of the harmonic component, which is superimposed on the fundamental component, with its envelope represented by the standing wave. Consequently, it becomes easy to control the amount of the excitation current.

In a further implantation, the rotor field winding has a first field winding section connected between the other end of the capacitor and the other end of the rectifying element and a second field winding section connected in parallel to the capacitor. At least one of a first resonance frequency based on an inductance of the first field winding section and the capacitance of the capacitor and a second resonance frequency based on an inductance of the second field winding section and the capacitance of the capacitor is within a predetermined frequency range which includes the frequency of the harmonic component, or the frequency of the harmonic component is between the first resonance frequency and the second resonance frequency.

With the above configuration, when the electric current, which is obtained by superimposing the harmonic component on the fundamental component, is supplied to the stator armature winding, it is easy for the field current induced in the first field winding section or the second field winding section of the rotor field winding to flow. Consequently, it becomes possible to lower the impedance of the rotor field winding during the excitation, thereby improving the excitation performance of the rotor field winding.

In another further implementation, the rotor field winding has a plurality of field winding sections connected in series with each other. The capacitor includes a plurality of capacitor units each of which has one end connected to the one end of the rectifying element and the other end connected to a corresponding one of junction points between the field winding sections. There are a plurality of resonant circuits formed of the plurality of field winding sections and the plurality of capacitor units. At least one of resonance frequencies of the resonant circuits is within a predetermined frequency range which includes the frequency of the harmonic component, or the frequency of the harmonic component is between any two of the resonance frequencies of the resonant circuits. With this configuration, since there are provided the plurality of resonance frequencies, it is easy to bring the frequency of the harmonic component into agreement with any one of the resonance frequencies of the resonant circuits or a frequency between any two of the resonance frequencies. Consequently, it becomes possible to facilitate flow of the field current inducted in the field winding sections of the rotor field winding.

In a still further implementation, the resonance frequencies of the resonant circuits are different from each other. With this configuration, it is possible to expand the resonance frequencies of the resonant circuits to a frequency band having a given bandwidth. Consequently, it becomes easy to bring the frequency of the harmonic component into agreement with any one of the resonance frequencies of the resonant circuits or a frequency between any two of the resonance frequencies. As a result, it becomes possible to facilitate flow of the field current inducted in the field winding sections of the rotor field winding.

In a further implementation, from low rotation to high rotation, the frequency of the harmonic component superimposed on the fundamental component is within a predetermined frequency range that includes a resonance frequency based on the inductance of the rotor field winding and the capacitance of the capacitor. With this configuration, it is possible to superimpose the harmonic component whose frequency is close to the resonance frequencies on the fundamental component from the low rotation to the high rotation of the field winding type rotating electric machine regardless of the frequency of the fundamental component. Consequently, it is possible to lower the impedance of the rotor field winding during the excitation, thereby improving the excitation performance of the rotor field winding. Moreover, it is also possible to suppress the amplitude of the harmonic component from the low rotation to the high rotation of the field winding type rotating electric machine, thereby reducing torque ripple caused by the harmonic component for the rotor excitation.

In a still further implementation, the predetermined frequency range is a range within which the excitation current induced in the rotor field winding or the rotational torque is higher than or equal to a predetermined value. With this configuration, it is possible to improve, through generation of the harmonic component, the excitation performance of the rotor field winding; it is also possible to increase the excitation current induced in the rotor field winding or the rotational torque.

In a further implementation, the stator armature winding includes phase windings of three phases. In inducing the excitation current in the rotor field winding in a rectangular-wave control region, the control circuit is configured to: (1) add a first negative voltage pulse, at a timing delayed by 30°-60° in electrical angle from a center of an ON duration of a waveform of a rectangular-wave voltage for generating the fundamental component applied to the phase winding of one of the three phases, to turn off for a predetermined duration during an ON duration of a waveform of a rectangular-wave voltage for generating the fundamental component applied to the phase winding of one of the remaining two phases while adding a first positive voltage pulse, which is a counterpart of the first negative voltage pulse, to turn on for a predetermined duration during an OFF duration of a waveform of a rectangular-wave voltage for generating the fundamental component applied to the phase winding of the other of the remaining two phases; or (2) add a second positive voltage pulse, at a timing delayed by 30°-60° in electrical angle from a center of an OFF duration of a waveform of a rectangular-wave voltage for generating the fundamental component applied to the phase winding of one of the three phases, to turn on for a predetermined duration during an OFF duration of a waveform of a rectangular-wave voltage for generating the fundamental component applied to the phase winding of one of the remaining two phases while adding a second negative voltage pulse, which is a counterpart of the second positive voltage pulse, to turn off for a predetermined duration during an ON duration of a waveform of a rectangular-wave voltage for generating the fundamental component applied to the phase winding of the other of the remaining two phases. With this configuration, it is possible to apply a pair of positive and negative voltage pulses to the phase windings of two adjacent phases, thereby generating one harmonic component during each control cycle.

In a still further implementation, the control circuit is configured to: (1) perform excitation via the rotor field winding six times at equal intervals during each control cycle by performing both the addition of the first negative voltage pulse and the first positive voltage pulse and the addition of the second positive voltage pulse and the second negative voltage pulse with the one of the three phases as a reference phase also for each of cases where either of the remaining two phases is a reference phase; or (2) perform excitation via the rotor field winding three times at equal intervals during each control cycle by performing either of the addition of the first negative voltage pulse and the first positive voltage pulse and the addition of the second positive voltage pulse and the second negative voltage pulse with the one of the three phases as a reference phase also for each of cases where either of the remaining two phases is a reference phase. With this configuration, it is possible to generate the harmonic components six times or three times at equal intervals during each control cycle. Consequently, it is possible to superimpose the harmonic components whose frequency is close to the resonance frequencies on the respective fundamental components in a predetermined rotation region.

In another further implementation, the stator armature winding includes phase windings of three phases. In inducing the excitation current in the rotor field winding in a rectangular-wave control region, the control circuit is configured to perform a first harmonic-wave generation process of: (1) adding a first negative voltage pulse, at the start of an ON duration of a waveform of a rectangular-wave voltage for generating the fundamental component applied to the phase winding of one of the three phases, to turn off for a predetermined duration while adding a first positive voltage pulse, which is a counterpart of the first negative voltage pulse, to turn on for a predetermined duration during an OFF duration of a waveform of a rectangular-wave voltage for generating the fundamental component applied to the phase winding of either of the remaining two phases; or (2) adding a second positive voltage pulse, at the end of an ON duration of a waveform of a rectangular-wave voltage for generating the fundamental component applied to the phase winding of one of the three phases, to extend the ON duration by a predetermined duration while adding a second negative voltage pulse, which is a counterpart of the second positive voltage pulse, to turn off for a predetermined duration during an ON duration of a waveform of a rectangular-wave voltage for generating the fundamental component applied to the phase winding of either of the remaining two phases. With this configuration, it is possible to apply a pair of positive and negative voltage pulses to the phase windings of two adjacent phases, thereby generating two harmonic components during each control cycle.

In a further implementation, the control circuit is configured to perform excitation via the rotor field winding six times at equal intervals during each control cycle by performing the first harmonic-wave generation process at both the timings of the start and the end of the ON duration of the waveform of the rectangular-wave voltage for each of the phase windings of the three phases. With this configuration, it is possible to generate the harmonic components six times at equal intervals during each control cycle. Consequently, it is possible to superimpose the harmonic components whose frequency is close to the resonance frequencies on the respective fundamental components in a predetermined rotation region.

In a still further implementation, the control circuit is configured to perform excitation via the rotor field winding three times at equal intervals during each control cycle by performing the first harmonic-wave generation process at either of the timings of the start and the end of the ON duration of the waveform of the rectangular-wave voltage for each of the phase windings of the three phases. With this configuration, it is possible to generate the harmonic components three times at equal intervals during each control cycle. Consequently, it is possible to superimpose the harmonic components whose frequency is close to the resonance frequencies on the respective fundamental components in a rotation region higher than the rotation region in the case of generating the harmonic components six times during each control cycle.

In a further implementation, in inducing the excitation current in the rotor field winding in the rectangular-wave control region, the control circuit is configured to add pairs of positive and negative voltage pulses to the waveforms of the rectangular-wave voltages, which are for generating the fundamental components applied to two phase windings that are circumferentially adjacent to each other, four times at equal intervals during each control cycle so as to make an average value of the applied voltage to each phase during each control cycle zero. With this configuration, it is possible to generate the harmonic components four times at equal intervals during each control cycle. Consequently, it is possible to superimpose the harmonic components whose frequency is close to the resonance frequencies on the respective fundamental components in a rotation region between the rotation region in the case of generating the harmonic components six times during each control cycle and the rotation region in the case of generating the harmonic components three times during each control cycle.

In a still further implementation, the control circuit is configured to perform excitation via the rotor field winding four times at equal intervals during each control cycle by performing a second harmonic-wave generation process while performing the first harmonic-wave generation process at both the timings of the start and the end of the ON duration of the waveform of the rectangular-wave voltage for a predetermined phase winding. The second harmonic-wave generation process is a process of adding pairs of positive and negative voltage pulses, at two timings that are offset by 90° in electrical angle respectively from the timings of the start and the end of the ON duration of the waveform of the rectangular-wave voltage for the predetermined phase winding, to the waveforms of the rectangular-wave voltages for generating the fundamental components applied to two phase windings that are circumferentially adjacent to each other. With this configuration, it is possible to generate the harmonic components four times at equal intervals during each control cycle.

In a further implementation, the frequency of adding the voltage pulses by the control circuit is within the predetermined frequency range. With this configuration, it is possible to superimpose, through the addition of the voltage pulses, the harmonic components whose frequency is close to the resonance frequencies on the respective fundamental components from the low rotation to the high rotation of the field winding type rotating electric machine regardless of the frequency of the fundamental components.

Hereinafter, exemplary embodiments will be described with reference to FIGS. 1-27.

First Embodiment

Figure 2:
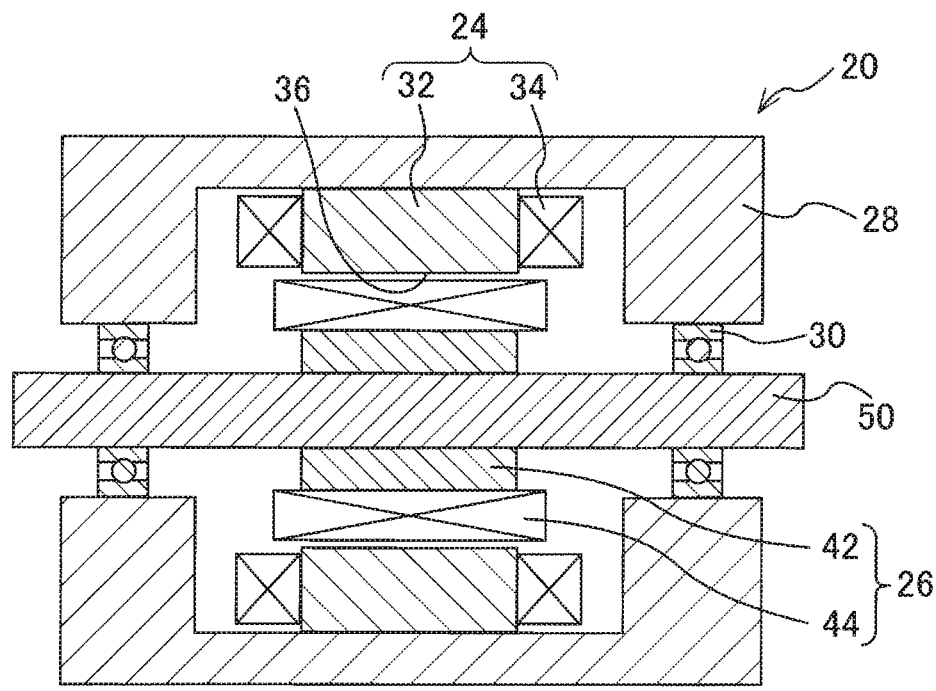
FIG. 2 is a configuration diagram of the field winding type rotating electric machine according to the first embodiment.

In the first embodiment, a field winding type rotating electric machine 20 is a synchronous motor-generator generator for use in, for example, a vehicle. Hereinafter, the field winding type rotating electric machine 20 will be simply referred to as the rotating electric machine 20. As shown in FIG. 1, the rotating electric machine 20 generates drive power for driving the vehicle upon being supplied with electric power from an electric power source 22 such as a battery. Moreover, the rotating electric machine 20 generates electric power for charging the battery upon being supplied with drive power from an engine of the vehicle. As shown in FIG. 2, the rotating electric machine 20 includes a stator (armature) 24, a rotor (field) 26, a housing 28 and bearings 30.

Figure 3:
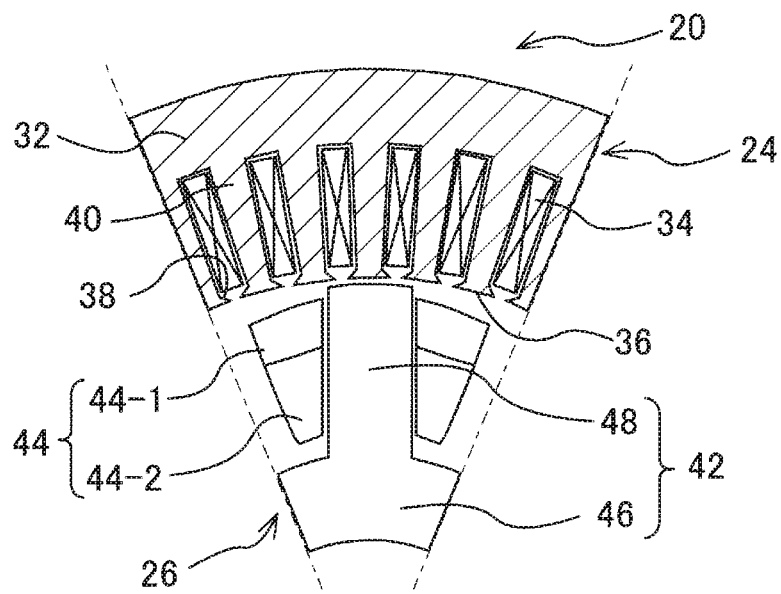
FIG. 3 is a cross-sectional view taken by cutting the field winding type rotating electric machine according to the first embodiment along a plane extending perpendicular to a rotating shaft.

The stator 24 is received in a space surrounded by the housing 28, and fixed to the housing 28. The stator 24 includes a stator core 32 and a stator armature winding 34. The stator core 32 forms part of a magnetic circuit through which magnetic flux flows. The stator core 32 is hollow cylindrical-shaped to have a bore 36 formed at its axial center. As shown in FIG. 3, the stator core 32 has a plurality of slots 38 and a plurality of teeth 40. Each of the slots 38 opens on a radially inner side of the core main body and extends in an axial direction. The slots 38 are arranged at predetermined intervals in a circumferential direction. In the slots 38, there are received straight portions of the stator armature winding 34. The stator armature winding 34 is wound on the teeth 40 of the stator core 32. The stator armature winding 34 includes phase windings of three phases U, V and W.

The rotor 26 is rotatably received in the bore 36 of the stator core 32. The rotor 26 is arranged radially inside the stator 24 to face the stator 24 with a predetermined air gap formed therebetween. The rotor 26 is rotatably supported by the housing 28 via the bearings 30. The rotor 26 includes a rotor core 42 and a rotor field winding 44. The rotor core 42 also forms part of the magnetic circuit through which magnetic flux flows.

The rotor core 42 has a boss portion 46 and a plurality of salient pole portions 48. The boss portion 46 is formed in a cylindrical shape and has a rotor shaft 50 inserted and fitted in a central bore thereof. Each of the salient pole portions 48 protrudes radially outward from the boss portion 46. The salient pole portions 48 are arranged at predetermined intervals in the circumferential direction. The salient pole portions 48 are main magnetic poles that constitute field poles (specifically, N poles and S poles). The rotor field winding 44 is wound around each of the salient pole portions 48 of the rotor core 42. That is, the rotor field winding 44 is concentratedly wound on each of the salient pole portions 48.

The rotating electric machine 20 includes a rectifying element 52. The rectifying element 52 is a diode that is connected to both ends of the rotor field winding 44. Specifically, the rectifying element 52 has its anode terminal connected to one end of the rotor field winding 44 and its cathode terminal connected to the other end of the rotor field winding 44. The rectifying element 52 has a function of half-wave rectifying AC voltage induced in the rotor field winding 44 and thereby restricting the direction of electric current flowing in the rotor field winding 44 to one direction. With the function of the rectifying element 52, each of the salient pole portions 48 is excited to form either an N pole or an S pole. Moreover, the salient pole portions 48 are excited to form N poles and S poles that are arranged alternately in the circumferential direction.

The rotating electric machine 20 includes a capacitor 54. The capacitor 54 has one end connected to both the anode terminal of the rectifying element 52 and one end of the rotor field winding 44 and the other end connected between the two ends of the rotor field winding 44. The capacitor 54 is a passive element capable of storing electric charge. The capacitor 54 has a capacitance C. In addition, it is preferable that the connection position between the other end of the capacitor 54 and the rotor field winding 44 is a boundary position at which the rotor field winding 44 is divided into a section susceptible to leakage magnetic flux and/or harmonic magnetic flux of the magnetic flux flowing to the field poles and a section impervious to the leakage magnetic flux and/or the harmonic magnetic flux. The rotor field winding 44, the rectifying element 52 and the capacitor 54 may be arranged in one circuit per pole or per pole pair or provided as a single set for the entire rotor core 42.

The rotor field winding 44 includes n field winding sections 44-1, 44-2, . . . , and 44-$n$ that are connected in series with each other. Hereinafter, in the present embodiment, suppose that the rotor field winding 44 includes two field winding sections, i.e., a first field winding section 44-1 and a second field winding section 44-2. The junction point between the first field winding section 44-1 and the second field winding section 44-2 is connected to the other end of the capacitor 54.

The first field winding section 44-1 is connected between the cathode terminal of the rectifying element 52 and the other end of the capacitor 54. The second field winding section 44-2 is connected in parallel to the capacitor 54. Both ends of the second field winding section 44-2 are connected between the one end of the capacitor 54 (or the anode terminal of the rectifying element 52) and the other end of the capacitor 54. The capacitor 54 has a function of storing, when the direction of a voltage $e1$ generated between the two ends of the first field winding section 44-1 and the direction of a voltage $e2$ generated between the two ends of the second field winding section 44-2 are opposite to each other and thus the two voltages $e1$ and $e2$ cancel each other, excitation energy corresponding to the mutually-canceling voltages.

The junction point between the first field winding section 44-1 and the second field winding section 44-2 is preferably set to the position at which the rotor field winding 44 is divided into a section susceptible to the leakage magnetic flux and/or the harmonic magnetic flux and a section impervious to the leakage magnetic flux and/or the harmonic magnetic flux. The first field winding section 44-1 has an inductance $L1$ while the second field winding section 44-2 has an inductance $L2$. On each of the salient pole portions 48, the first field winding section 44-1 is arranged on the side closer to the stator core 32 in the radial direction and the second field winding section 44-2 is arranged on the side further from the stator core 32 in the radial direction. That is, the first field winding section 44-1 is arranged closer to the stator core 32 (i.e., more radially outward) than the second field winding section 44-2 is.

In addition, the arrangement of the first field winding section 44-1 and the second field winding section 44-2 may be realized by, for example, winding the second field winding section 44-2 on each of the salient pole portions 48 of the rotor core 42 and then winding the first field winding section 44-1 on the radially outer side of the second field winding section 44-2.

As shown in FIG. 1, to the rotating electric machine 20, there is connected an inverter circuit 60 that is connected in parallel to the electric power source 22. Specifically, the inverter circuit 60 is connected to the stator armature winding 34 to apply voltages to the U-phase, V-phase and W-phase windings of the stator armature winding 34. The inverter circuit 60 has, for each of the U, V and W phases, one arm element pair consisting of an upper arm element 62 and a lower arm element 64 that are connected in series with each other between the two ends of the electric power source 22. That is, the inverter circuit 60 has three arm element pairs respectively corresponding to the U-phase, V-phase and W-phase windings.

Each of the arm elements 62 and 64 is formed of a switching element 66, such as an insulated-gate bipolar transistor (i.e., IGBT) or a MOS field-effect transistor, and a freewheeling diode 68. For each of the U, V and W phases, the switching elements 66 of the upper and lower arm elements 62 and 64 of the phase are turned on and off in antiphase to each other. Moreover, the switching elements 66 of the upper arm elements 62 of the U, V and W phases are respectively turned on for predetermined durations with predetermined phase differences provided therebetween.

To both ends of the inverter circuit 60, there is connected a smoothing capacitor 70. The smoothing capacitor 70 is connected to both ends of the electric power source 22. That is, the smoothing capacitor 70 is connected in parallel to the electric power source 22. The smoothing capacitor 70 is provided to smooth a voltage generated between the two ends of the inverter circuit 60.

To the inverter circuit 60, there is connected a control circuit 72. The control circuit 72 is connected with each of the switching elements 66 of the arm elements 62 and 64 of the inverter circuit 60 to control the inverter circuit 60. To the control circuit 72, there is connected a position sensor 74 for detecting the rotational position of the rotor 26. Based on the rotational position of the rotor 26 detected by the position sensor 74, the control circuit 72 drives the inverter circuit 60 so as to supply desired electric currents to the stator armature winding 34. With the switching elements 66 being driven according to drive commands from the control circuit 72, the inverter circuit 60 applies voltages to the U-phase, V-phase and W-phase windings so as to create a desired rotating magnetic field from the stator armature winding 34.

Next, operation of the rotating electric machine 20 according to the present embodiment will be described.

To induce field current in the rotor field winding 44, the control circuit 72 supplies to the stator armature winding 34 excitation components exciting the rotor core 42 in addition to fundamental components (i.e., synchronous currents) for causing the rotating electric machine 20 to generate rotational torque. That is, the control circuit 72 controls the inverter circuit 60 so as to supply to the stator armature winding 34 electric currents that are obtained by superimposing the excitation components for the rotor excitation on the respective fundamental components for generating rotational torque; the excitation components have a shorter period than the fundamental components. The control circuit 72 controls the amplitudes and periods of the fundamental components and the excitation components severally.

Figure 4:
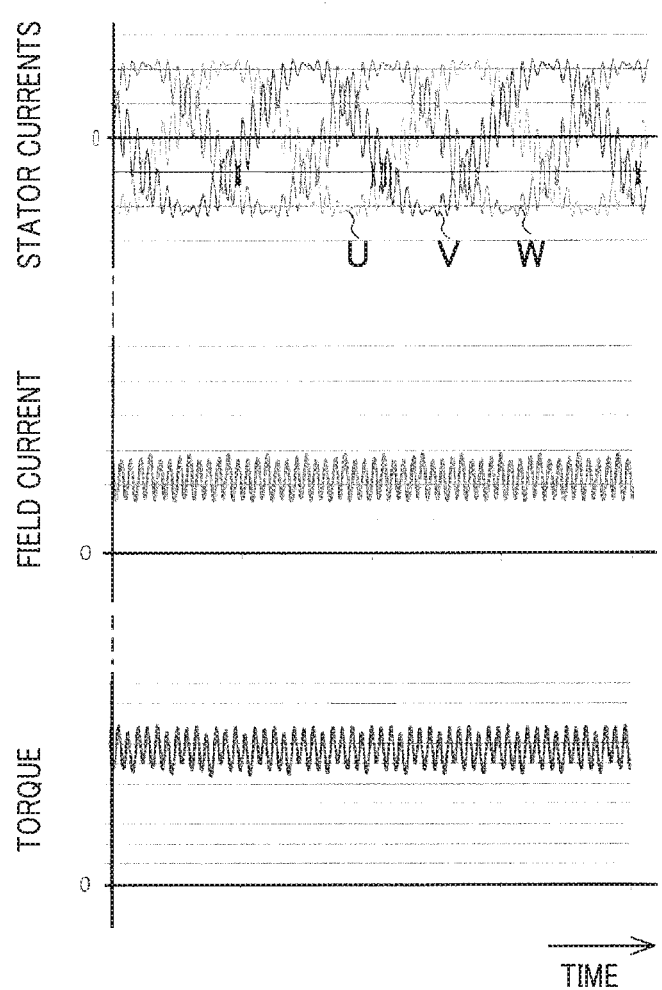
FIG. 4 is a waveform chart illustrating the changes with time of examples of phase currents flowing in respective phases of a stator armature winding, excitation current for exciting a rotor and the generated torque in the field winding type rotating electric machine according to the first embodiment.
Figure 5:
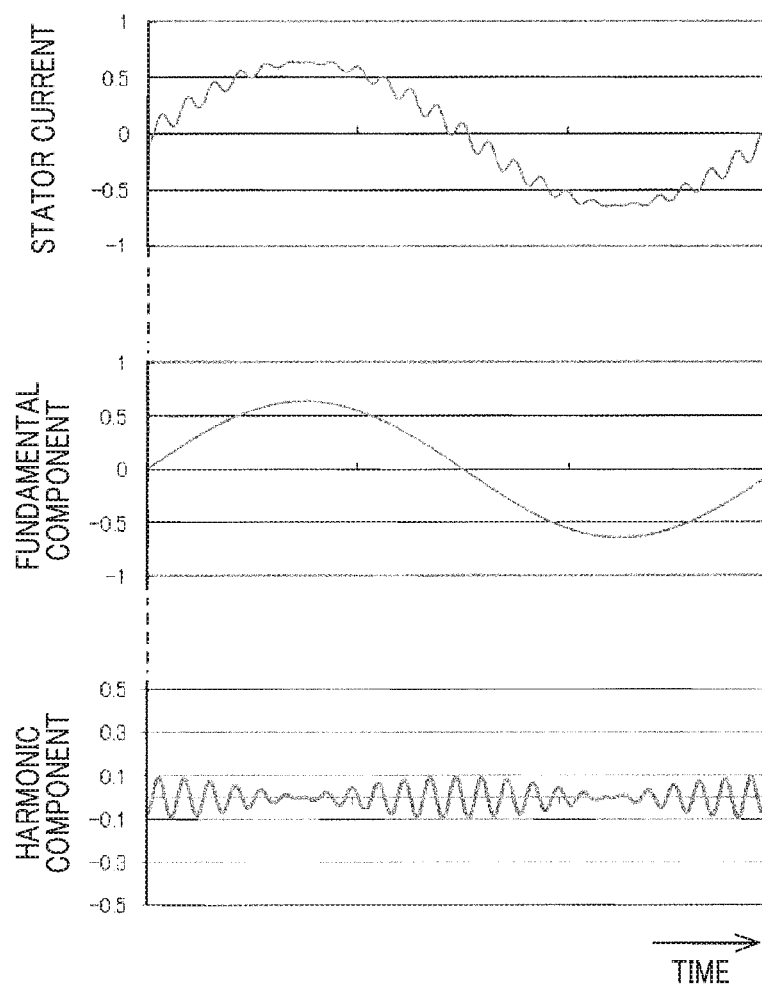
FIG. 5 is a waveform chart illustrating the changes with time of examples of the phase current flowing in one phase of the stator armature winding, a fundamental component of the phase current and a harmonic component of the phase current for the rotor excitation in the field winding type rotating electric machine according to the first embodiment.
Figures 6, 7:
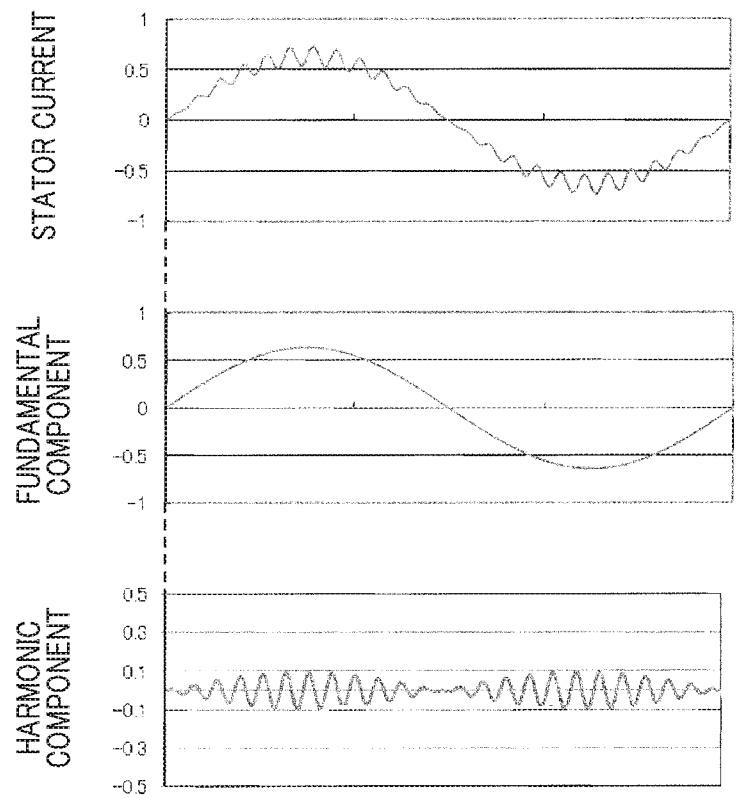
FIG. 6 is a waveform chart illustrating the changes with time of examples, which are different from those shown in FIG. 5, of the phase current flowing in one phase of the stator armature winding, the fundamental component of the phase current and the harmonic component of the phase current for the rotor excitation in the field winding type rotating electric machine according to the first embodiment.
FIG. 7 is a diagram illustrating the relationships between the directions of voltages generated in a rotor field winding, the total voltage, the generated current and the current conversion efficiency in the field winding type rotating electric machine according to the first embodiment.

As shown in FIG. 4, each of the electric currents supplied to the stator armature winding 34 is an electric current sum that is obtained by superimposing the excitation component on the fundamental component as described above. Moreover, as shown in FIGS. 5 and 6, the fundamental component is electric current that changes with time in the form of a sine wave. The excitation component for the rotor excitation is electric current that has a shorter period (i.e., higher frequency) and smaller amplitude than the fundamental component. The excitation component, which pulsates with respect to the fundamental component, is a harmonic component that continuously changes with time.

The harmonic component for the rotor excitation has its envelope represented by a standing wave whose period is ½ of the period of the fundamental component. The phase of the harmonic component for the rotor excitation with respect to the fundamental component is set so that the maximum amplitude of the harmonic component appears avoiding a necessary timing of the fundamental component. For example, as shown in FIG. 5, the phase of the harmonic component may be adjusted to have the maximum amplitude of the harmonic component appear at a different timing from the maximum amplitude of the fundamental component. Otherwise, as shown in FIG. 6, the phase of the harmonic component may be adjusted to have the maximum amplitude of the harmonic component appear at the same timing as the maximum amplitude of the fundamental component. Moreover, the amplitude of the harmonic component for the rotor excitation is adjusted to be smaller than the amplitude of the fundamental component.

Upon the fundamental current being supplied from the inverter circuit 60 to each phase winding of the stator armature winding 34 according to the drive commands of the control circuit 72, a rotating magnetic field for rotating the rotor 26 is created. Moreover, upon the harmonic current being supplied to each phase winding of the stator armature winding 34, alternating magnetic field is generated in response to the harmonic current, thereby generating excitation magnetic flux. In this case, the excitation magnetic flux crosses the salient pole portions 48 of the rotor core 42, causing an AC voltage to be generated in the rotor field winding 44 and thereby inducing the field current. With the fundamental current flowing in the stator armature winding 34 and the filed current flowing in the rotor field winding 44, rotational torque is generated to rotate the rotating electric machine 20.

The rectifying element 52 is connected to both the ends of the rotor field winding 44. That is, the rotor field winding 44 is short-circuited via the rectifying element 52. Therefore, even with the alternating voltage being generated in the rotor field winding 44 as described above, electric current flows only in one direction in the rotor field winding 44. Consequently, the rotor core 42 is excited in a predetermined direction to form the field poles (specifically, N poles and S poles) in the rotor core 42. The field flux for forming the field poles is generated by the supply of the excitation current for the rotor excitation to the stator armature winding 34 and the rectification of the electric current flowing in the rotor field winding 44.

On the other hand, the rotor field winding 44 has an inductance; sections of the rotor field winding 44 on each pole form partial inductances. The magnetic flux flowing to the field poles includes leakage magnetic flux and harmonic magnetic flux. Therefore, the amount and direction of the magnetic flux flowing through the rotor field winding 44 varies depending on the position of the rotor field winding 44. Consequently, the directions of the voltages generated in the sections of the rotor field winding 44 are not uniform, but vary depending on time and the rotational position of the rotor.

Specifically, as shown in FIG. 7, there are four patterns of the directions of the voltages generated in the rotor field winding 44 that consists of the two field winding sections 44-1 and 44-2. The four patterns include: two patterns (pattern 1 and pattern 4) where the direction of the voltage e1 generated in the first field winding section 44-1 and the direction of the voltage e2 generated in the second field winding section 44-2 are the same; and two patterns (pattern 2 and pattern 3) where the direction of the voltage e1 generated in the first field winding section 44-1 and the direction of the voltage e2 generated in the second field winding section 44-2 are opposite to each other. As in the pattern 2 and pattern 3, when mutually-canceling voltages are generated in the sections of the rotor field winding 44, the total voltage of the rotor field winding 44 is lowered, reducing the excitation current. Consequently, a loss of the excitation energy may occur.

Figure 8:
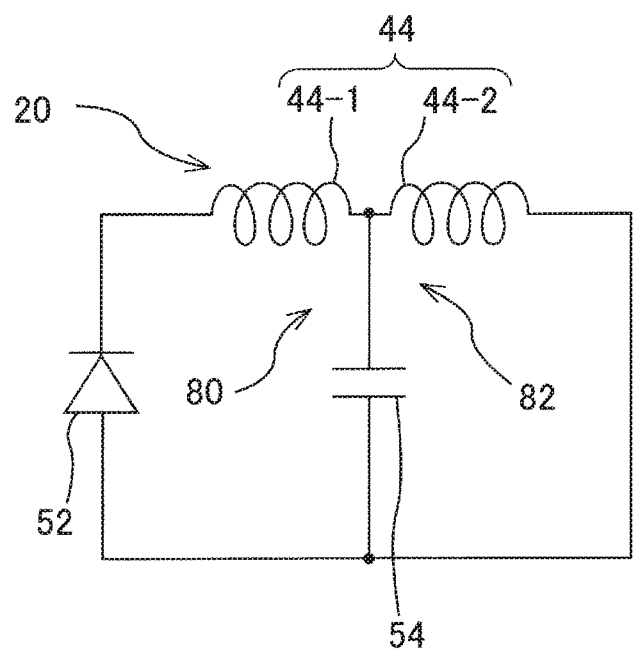
FIG. 8 is a circuit diagram of an essential part, including the rotor field winding, of the field winding type rotating electric machine according to the first embodiment.

In contrast, in the rotating electric machine 20 according to the present embodiment, as shown in FIG. 8, the rectifying element 52 is connected to both the ends of the rotor field winding 44 and the capacitor 54 is connected between the anode terminal of the rectifying element 52 and a middle point in the rotor field winding 44. That is, there is provided the capacitor 54 that has one end connected to the anode terminal of the rectifying element 52 and the other end connected between the two ends of the rotor field winding 44.

Figure 9:
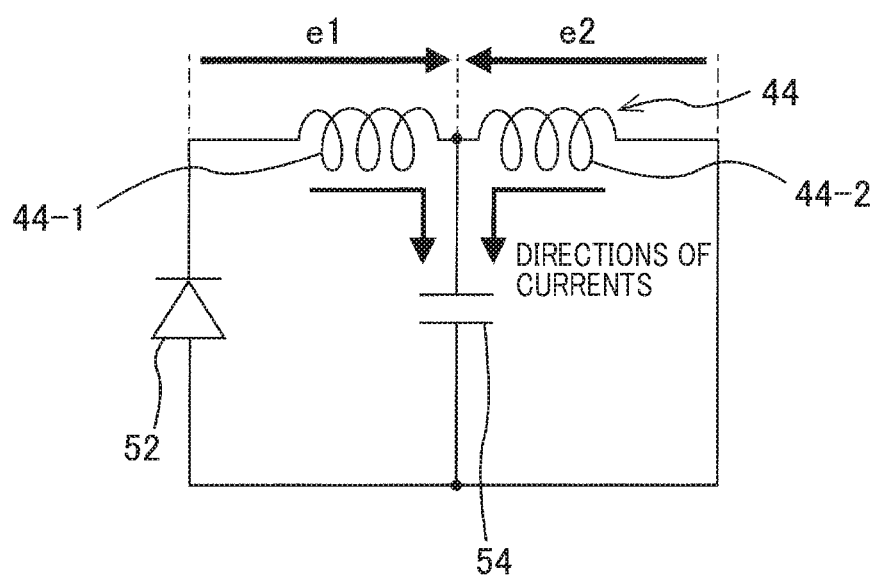
FIG. 9 is a diagram illustrating a capacitor being charged with voltages being respectively generated in two field winding sections of the rotor field winding in directions canceling each other in the field winding type rotating electric machine according to the first embodiment.
Figure 10:
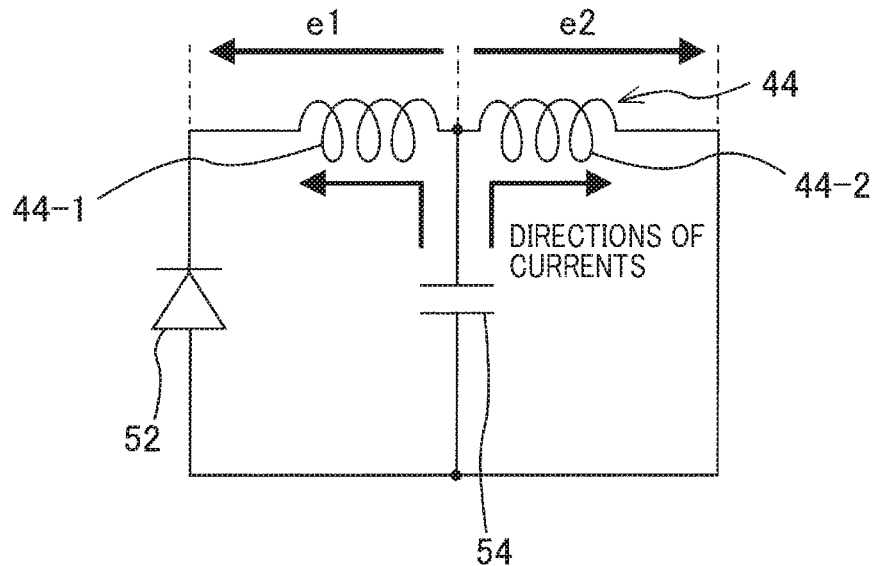
FIG. 10 is a diagram illustrating the capacitor being discharged with voltages being respectively generated in the two field winding sections of the rotor field winding in directions canceling each other in the field winding type rotating electric machine according to the first embodiment.

In the rotating electric machine 20 having the above-described structure, as shown in FIG. 9, the voltages e1 and e2 may be applied so that: the directions of the voltages applied to the first and second field winding sections 44-1 and 44-2, which are demarcated from each other at the connection point between the rotor field winding 44 and the capacitor 54, are opposite to each other and thus the voltages e1 and e2 cancel each other; and electric currents flow in the first and second field winding sections 44-1 and 44-2 from those ends of the field winding sections 44-1 and 44-2 which are connected to the rectifying element 52 to those ends of the field winding sections 44-1 and 44-2 which are connected to the other end of the capacitor 54 (i.e., the pattern 2). In this case, the electric currents flow through the first and second field winding sections 44-1 and 44-2 to the capacitor 54. Consequently, excitation energy corresponding to the mutually-canceling voltages is stored in the capacitor 54, thereby charging the capacitor 54.

After the charge of the capacitor 54 as described above, as shown in FIG. 10, the voltage directions of the first and second field winding sections 44-1 and 44-2 may be switched so that: the voltages e1 and e2 are applied in mutually-canceling directions; and electric currents flow in the first and second field winding sections 44-1 and 44-2 from those ends of the field winding sections 44-1 and 44-2 which are connected to the other end of the capacitor 54 to those ends of the field winding sections 44-1 and 44-2 which are connected to the rectifying element 52 (i.e., the pattern 3). In this case, electric current flows from the capacitor 54 to the field winding sections 44-1 and 44-2. Consequently, the energy stored in the capacitor 54 is charged to the field winding sections 44-1 and 44-2, thereby discharging the capacitor 54. Thereafter, the charge and discharge of the capacitor 54 may be repeated.

As above, when the voltages e1 and e2, which are respectively generated in the first and second field winding sections 44-1 and 44-2 due to the leakage magnetic flux and/or the harmonic magnetic flux, cancel each other, the total voltage applied to the entire rotor field winding 44 is lowered. However, the excitation energy corresponding to the mutually-cancelling voltages is stored in the capacitor 54. Further, when the directions of the voltages are switched after the charge of the capacitor 54, the energy stored in the capacitor 54 is discharged to the rotor field winding 44, thereby being converted into the excitation current for exciting the rotor core 42.

Accordingly, in the rotating electric machine 20 according to the present embodiment, when voltages are generated in mutually-canceling directions in the field winding sections 44-1 and 44-2 of the rotor field winding 44, it is possible to efficiently convert the excitation energy generated in the rotor field winding 44 into the excitation current, thereby securing the field current. Hence, it is possible to prevent a loss of the excitation energy from occurring due to reduction in the excitation current when voltages are generated in mutually-canceling directions in the field winding sections 44-1 and 44-2 of the rotor field winding 44. Consequently, it is possible to efficiently excite the rotor core 42 even when a situation occurs where the voltages cancel each other.

Moreover, since the field current can be secured as described above, it is possible to suppress the amplitude of the harmonic components which are necessary for forming the field poles in the rotor core 42 and which are superimposed on the respective fundamental components supplied to the stator armature winding 34. Hence, with the above structure of the rotating electric machine 20, it is possible to reduce torque ripple (see FIG. 4) in compassion with the case of the amplitude of the harmonic components being relatively large.

Furthermore, in the rotating electric machine 20, on each of the salient pole portions 48, the first field winding section 44-1 of the rotor field winding 44 is arranged on the side closer to the stator core 32 in the radial direction and the second field winding section 44-2 of the rotor field winding 44 is arranged on the side further from the stator core 32 in the radial direction. The magnetic flux flowing to the salient pole portions 48 of the rotor core 42 includes leakage magnetic flux. Therefore, the amount and direction of the magnetic flux flowing through the rotor field winding 44 varies depending on the position of the rotor field winding 44. This phenomenon is remarkable particularly with harmonic magnetic flux. In the rotor field winding 44, the difference between the amount of magnetic flux on the side closer to the stator core 32 and the amount of magnetic flux on the side further from the stator core 32 (i.e., on the side of the boss portion 46 of the rotor core 42) is large. Consequently, it is possible to increase the energy stored in the capacitor 54 by an amount corresponding to the difference, thereby effectively generating the field current.

Furthermore, in the rotating electric machine 20, the first field winding section 44-1 of the rotor field winding 44 and the capacitor 54 together form a resonant circuit. Hereinafter, the resonant circuit formed of the first field winding section 44-1 and the capacitor 54 will be referred to as first resonant circuit 80. The first resonant circuit 80 has a first resonance frequency f1. The first resonance frequency f1 can be calculated based on the inductance L1 of the first field winding section 44-1 and the capacitance C of the capacitor 54 by the following Equation (1).

Similarly, the second field winding section 44-2 of the rotor field winding 44 and the capacitor 54 together form another resonant circuit. Hereinafter, the resonant circuit formed of the second field winding section 44-2 and the capacitor 54 will be referred to as second resonant circuit 82. The second resonant circuit 82 has a second resonance frequency f2. The second resonance frequency f2 can be calculated based on the inductance L2 of the second field winding section 44-2 and the capacitance C of the capacitor 54 by the following Equation (2).

$$f1=1/(2\times\pi\times(L1\times C)^{1/2}) \qquad (1)$$

$$f2=1/(2\times\pi\times(L2\times C)^{1/2}) \qquad (2)$$

The inductance L1 of the first field winding section 44-1 and the capacitance C of the capacitor 54 are in a resonant relationship with the frequency of the harmonic components for the rotor excitation which are superimposed on the respective fundamental components supplied to the stator armature winding 34 and continuously change with time. Moreover, the inductance L2 of the second field winding section 44-2 and the capacitance C of the capacitor 54 are also in a resonant relationship with the frequency of the harmonic components. That is, at least one of the first resonance frequency f1 and the second resonance frequency f2 is equal to or in the vicinity of the frequency of the harmonic components. In addition, both the first resonance frequency f1 and the second resonance frequency f2 may be set to be equal to or in the vicinity of the frequency of the harmonic components.

Moreover, the first resonance frequency f1 and the second resonance frequency f2 may be set to be different from each other, thereby expanding the resonance frequency band. This configuration makes it easier to bring the frequency of the harmonic components into agreement with the resonance frequencies f1 and f2 of the resonant circuits 80 and 82. Furthermore, in this case, when the two resonance frequencies f1 and f2 are approximate to each other and resonance occurs at a frequency between the two resonance frequencies f1 and f2, the frequency of the harmonic components may be set to fall between the two resonance frequencies f1 and f2. This configuration makes it easier to bring the frequency of the harmonic components into agreement with a frequency between the two resonance frequencies f1 and f2.

With at least one of the first resonance frequency f1 and the second resonance frequency f2 being in a resonant relationship with the frequency of the harmonic components, it is possible to facilitate flow of the field current in comparison with the case of neither of the first and second resonance frequencies f1 and f2 being in a resonant relationship with the frequency of the harmonic components; the field current is induced in the rotor field winding 44 on each pole when electric currents, which are obtained by superimposing the harmonic components on the respective fundamental components, are supplied to the stator armature winding 34. Consequently, it is possible to lower the impedance of the rotor field winding 44 during the excitation, thereby improving the excitation performance of the rotor field winding 44.

When the impedance of the rotor field winding 44 during the excitation is low, the excitation of the rotor field winding 44 can be suitably performed even if the amplitude of the harmonic components for the rotor excitation is small. That is, it is possible to suitably induce the excitation current in the rotor field winding 44 even if the amplitude of the harmonic components for the rotor excitation is small. Consequently, it is possible to suppress the amplitude of the harmonic components that are superimposed on the respective fundamental components supplied to the stator armature winding 34, thereby reducing torque ripple caused by the harmonic components for the rotor excitation.

Moreover, in the rotating electric machine 20, the harmonic components for the rotor excitation are controlled separately from the fundamental components. Each of the harmonic components has its envelope represented by a standing wave whose period is ½ of the period of the fundamental components. The phases of the harmonic components for the rotor excitation with respect to the respective fundamental components are set so that the maximum amplitude of the harmonic components appears avoiding necessary timings of the respective fundamental components. Consequently, it is possible to suitably perform excitation of the rotor field winding 44 with the harmonic components while suitably performing generation of the rotational torque with the fundamental components. Furthermore, the amplitude of the harmonic components is adjusted to be smaller than the amplitude of the fundamental components. Consequently, it is possible to adjust the amplitude of the harmonic components, which are superimposed on the respective fundamental components, with the envelop of each of the harmonic components being the standing wave, thereby controlling the amount of the excitation current for exciting the rotor field winding 44. As a result, it is possible to facilitate control of the amount of the excitation current.

Next, a method of generating the harmonic components by the control circuit 72 will be described.

The control circuit 72 controls the inverter circuit 60 to have the harmonic components superimposed on the respective fundamental components from low rotation (e.g., 0 [rpm]) to high rotation (e.g., MAX [rpm] such as 15000 [rpm]) of the rotating electric machine 20. Specifically, the control of the inverter circuit 60 by the control circuit 72 is performed to have the harmonic components superimposed on the respective fundamental components within a predetermined frequency range, which includes at least one of the resonance frequencies f1 and f2 of the resonant circuits 80 and 82, from the low rotation to the high rotation of the rotating electric machine 20. The predetermined frequency range is a range within which the excitation current caused by the superimposed harmonic components to flow in the rotor field winding 44 or the torque obtained with the excitation current becomes higher than or equal to a predetermined value. Moreover, the predetermined frequency range is within, for example, ±40% with respect to the resonance frequencies f1 and f2. In addition, the predetermined frequency range is preferably within, for example, ±25% with respect to the resonance frequencies f1 and f2.

With the above control process, it is possible to superimpose the harmonic components whose frequency is close to the resonance frequencies f1 and f2 on the respective fundamental components from the low rotation to the high rotation regardless of the frequency of the fundamental components. Consequently, it is possible to lower the impedance of the rotor field winding 44 during the excitation, thereby improving the excitation performance of the rotor field winding 44. Moreover, it is also possible to suppress, from the low rotation to the high rotation, the amplitude of the harmonic components that are superimposed on the respective fundamental components supplied to the stator armature winding 34, thereby reducing torque ripple caused by the harmonic components for the rotor excitation.

Specifically, the control circuit 72 performs the control of the inverter circuit 60 for applying voltages to the three phase windings of the stator armature winding 34, switching the mode of the control between a PWM (Pulse Width Modulation) control mode and a rectangular-wave control mode. In addition, the PWM control mode is a control mode in which electric current feedback is performed. In the PWM control mode, the control unit 72 outputs to the inverter circuit 60 a plurality of pulse voltages that are pulse-width-modulated based on comparison between voltage commands generated according to torque commands and carrier waves (e.g., triangular waves). The PWM control mode is a control mode excellent in control responsiveness. The PWM control mode is used from the low rotation to medium rotation of the rotating electric machine 20. On the other hand, the rectangular-wave control mode is a control mode in which torque feedback is performed by performing phase control of rectangular-wave voltages. In the rectangular-wave control mode, the control unit 72 outputs to the inverter circuit 60 a rectangular-wave voltage whose amplitude is fixed to a maximum value or a minimum value every 180° in electrical angle during each control cycle (i.e., 360° in electrical angle). The rectangular-wave control mode is used from the medium rotation to the high rotation of the rotating electric machine 20.

In a PWM control region (low rotation-medium rotation) in which the PWM control mode is used, to generate the harmonic components for inducing the excitation current in the rotor field winding 44, the control circuit 72 PWM-drives the inverter circuit 60 so as to supply electric currents that are obtained by superimposing the harmonic components on the respective fundamental components. On the other hand, in a rectangular-wave control region (medium rotation-high rotation) in which the rectangular-wave control mode is used, to generate the harmonic components for inducing the excitation current in the rotor field winding 44, the control circuit 72 performs a harmonic-wave generation process which will be described in detail later.

In the rectangular-wave control mode, supplying pulse currents, which generate a magnetic field in the same direction as that generated by the fundamental component, to the stator armature winding 34 at a timing delayed by 90° in electrical angle with respect to the fundamental component is effective in generating magnetic flux that induces the excitation current in the rotor field winding 44. Taking one phase as a reference (hereinafter, to be referred to as reference phase; e.g., the V phase), the phases to which the pulse currents can be supplied are two adjacent phases (e.g., the U and W phases) that are different from the reference phase and circumferentially adjacent to each other. Accordingly, to supply pulse currents so as to generate magnetic field in the same direction as that generated by the fundamental component, the pulse currents may be supplied to the two adjacent phases at a timing delayed by 90° in electrical angle with respect to the fundamental component of the reference phase.

Figure 11:
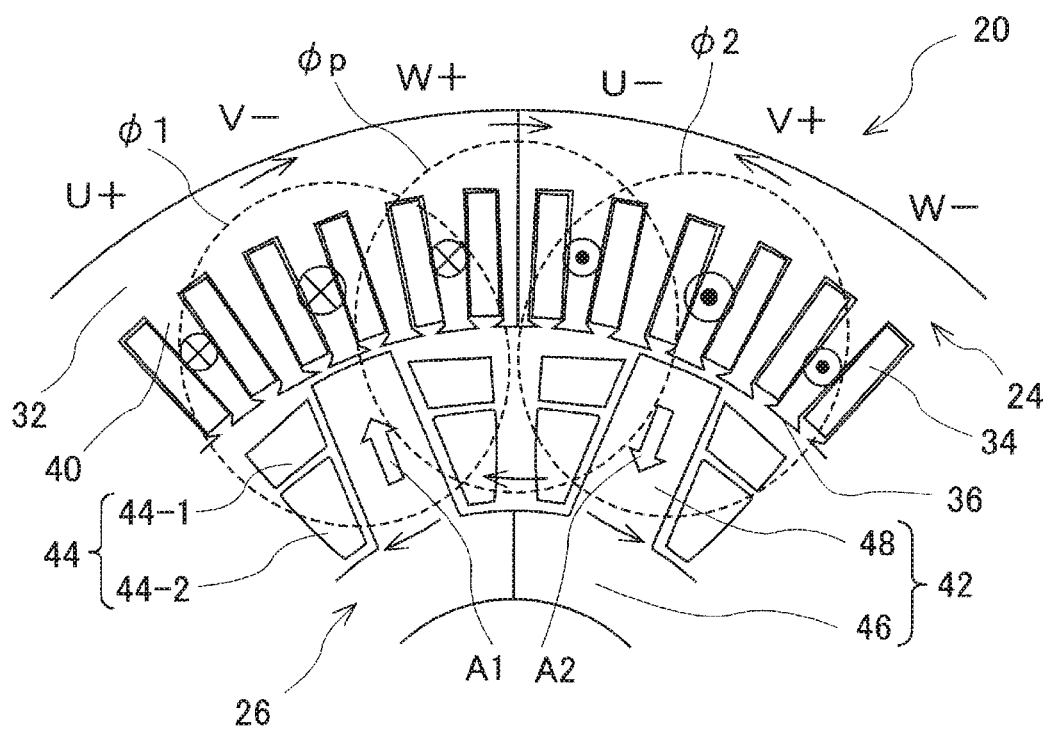
FIG. 11 is a diagram illustrating magnetic fields created between a stator and the rotor when electric current flowing in a V-phase winding has its maximum value in the field winding type rotating electric machine according to the first embodiment.

For example, as shown in FIG. 11, when the V-phase fundamental current flowing in the phase winding of the V phase that is the reference phase has its maximum value, between the stator 24 and the rotor 26, there are generated by the V-phase current both magnetic flux φ1 in a clockwise direction and magnetic flux φ2 in a counterclockwise direction and adjacent to the magnetic flux φ1. That is, the circumferentially-adjacent magnetic fluxes φ1 and φ2 flow in opposite directions to each other. In this case, the salient pole portion 48 of the rotor core 42 on one side (i.e., the left side in FIG. 11) is magnetized in the direction of an arrow A1 to form an N pole while the salient pole portion 48 on the other side (i.e., the right side in FIG. 11) is magnetized in the direction of an arrow A2 to form an S pole.

In addition, in FIG. 11, "U", "V" and "W" respectively designate the three phases of the stator armature winding 34, and "+" and "−" affixed to each phase indicate directions of the electric currents flowing in the stator armature winding 34. For example, when positive electric current flows in the V phase, "V+" denotes that the electric current flows in the V-phase winding in a direction out of the paper surface of FIG. 11 whereas "V−" denotes that the electric current flows in the V-phase winding in a direction into the paper surface of FIG. 11. In addition, denotations when negative electric current flows in the V phase are opposite to those described above.

Moreover, when the above-described magnetic fluxes φ1 and φ2 are generated, it is possible to further generate magnetic flux φp between the stator 24 and the rotor 26 and thereby excite the rotor field winding 44; the magnetic flux φp is circumferentially adjacent to both the magnetic fluxes φ1 and φ2, i.e., at the circumferential center between the magnetic fluxes φ1 and φ2 and flows in the clockwise direction the same as the direction of the magnetic flux φ1. The magnetic flux φp in the clockwise direction is generated by both pulse current flowing in the phase winding designated by "U−" and pulse current flowing in the phase winding designated by "W+" and circumferentially adjacent to the phase winding designated by "U−". Consequently, by generating the magnetic flux φp in addition to the magnetic fluxes φ1 and φ2, it is possible to excite the rotor field winding 44.

Moreover, the fundamental current is delayed from the voltage by a predetermined electrical angle (e.g., 20-45°) corresponding to the power factor (e.g., 0.7-0.9). On the other hand, the pulse currents are hardly delayed from the pulse voltages. Therefore, the optimal timing for adding a pair of positive and negative voltage pulses, which corresponds to the pulse currents to be supplied to the two adjacent phases, to the fundamental components of the two adjacent phases is a timing that is delayed by the predetermined electrical angle corresponding to the power factor from the center of an ON duration (a positive voltage center) of the waveform of the rectangular-wave voltage; the center of the ON duration corresponds to a positive current center of the fundamental component of the reference phase.

However, to apply the pair of positive and negative voltage pulses to the two adjacent phase windings, it is necessary for the rectangular-wave voltages, which correspond to the fundamental components of the two adjacent phases, to be in different states from each other (i.e., a Hi state and a Lo state). The electrical angle from the positive voltage center of the reference phase until the states of the rectangular-wave voltages of the two adjacent phases become different from each other is 30°, i.e., the electrical angle from the positive voltage center of the reference phase to the start of an ON duration of the waveform of the rectangular-wave voltage that corresponds to the fundamental component of one of the two adjacent phases. Accordingly, applying the pair of positive and negative voltage pulses to the two adjacent phase windings after the timing delayed by 30° in electrical angle from the positive voltage center of the reference phase, it is possible to superimpose the harmonic component on the fundamental component, thereby generating magnetic flux that induces the excitation current of the rotor field winding 44. That is, in the rectangular-wave control region, it is possible to create by the two adjacent phases a magnetic field, which is in the same direction as a magnetic field created by supply of the fundamental current of the reference phase, thereby inducing the excitation current in the rotor field winding 44.

Figures 12, 13:
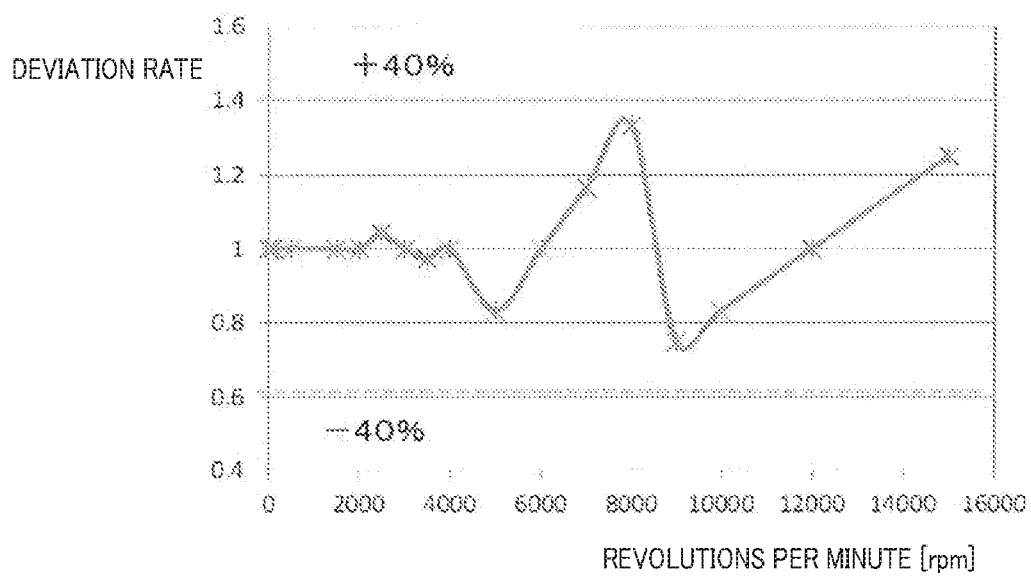
FIG. 12 is a table showing the period of the fundamental components supplied to the stator armature winding, the target number of pulses of the harmonic components, the actual number of pulses and the deviation rate of the actual frequency of the harmonic components with respect to the resonance frequency for each rpm value in the case of the rotor having four pole pairs in the field winding type rotating electric machine according to the first embodiment.
FIG. 13 is a diagram illustrating the relationship between the rpm and the deviation rate shown in FIG. 12.

The resonance frequencies f1 and f2 of the above-described resonant circuits 80 and 82 are constant. On the other hand, the frequency (or period) of the fundamental components supplied to the stator armature winding 34 changes with the rpm of the rotating electric machine 20. Specifically, the period of the fundamental components decreases with increase in the rpm of the rotating electric machine 20. Moreover, the target number of pulses of the harmonic components per control cycle (i.e., 360° in electrical angle) optimal for improvement of the excitation performance of the rotor field winding 44 decreases with increase in the rpm of the rotating electric machine 20. For example, in the case of the rotor 26 of the rotating electric machine 20 having four pole pairs, the target number of pulses decreases with increase in the rpm, as shown in FIG. 12. Moreover, in this case, for example, when the rpm is higher than the medium rotation (specifically, 4000), the target number of pulses is less than or equal to 9.

To generate one harmonic component to be superimposed on the fundamental component of the reference phase (e.g., the V phase) during each control cycle, one pair of positive and negative voltage pulses may be applied to the phase windings of the two adjacent phases (e.g., the U and W phases) that are adjacent to each other. There is a method of applying one pair of positive and negative voltage pulses to the two adjacent phases, according to which: a negative voltage pulse (shown by shading in FIG. 16) is added, at the start of an ON duration of the waveform of the rectangular-wave voltage for generating the fundamental component applied to the phase winding of one (first phase) of the two adjacent phases, to cut out the ON duration and thus turn off the voltage for a predetermined duration a; meanwhile, a positive voltage pulse (shown by hatching in FIG. 16), which is the counterpart of the negative voltage pulse, is added to an OFF duration of the waveform of the rectangular-wave voltage for generating the fundamental component applied to the phase winding of the other (second phase) of the two adjacent phases, so as to turn on the voltage for a predetermined duration a. The application of the negative voltage pulse at the start of the ON duration of the waveform of the rectangular-wave voltage of the first phase and the application of the positive voltage pulse during the OFF duration of the waveform of the rectangular-wave voltage of the second phase are performed at the same timing (e.g., electrical angle ω5-ω6 in FIG. 16). In addition, the predetermined durations a are electrical angles required to generate the harmonic component for improving the excitation performance of the rotor field winding 44.

With the above process of applying one pair of positive and negative voltage pulses to the phase windings of the two adjacent phases with respect to the reference phase, it is possible to generate one harmonic component. By performing the application of one pair of positive and negative voltage pulses to the phase windings of the two adjacent phases with respect to the reference phase for each of all the cases where the reference phase is any one of the three phases (rotor positions "1", "3" and "5" in FIG. 15 and electrical angles ω1-ω2, ω5-ω6 and ω9-ω10 in FIG. 16), it is possible to generate the harmonic components three times at equal intervals during each control cycle.

Moreover, there is another method of applying one pair of positive and negative voltage pulses to the two adjacent phases, according to which: a positive voltage pulse is added, at the end of an ON duration of the waveform of the rectangular-wave voltage for generating the fundamental component applied to the phase winding of a first phase of the two adjacent phases, to extend the ON duration and thus further keep the voltage on for a predetermined duration a; meanwhile, a negative voltage pulse, which is the counterpart of the positive voltage pulse, is added to an ON duration of the waveform of the rectangular-wave voltage for generating the fundamental component applied to the phase winding of the a second phase of the two adjacent phases, so as to turn off the voltage for a predetermined duration a. The application of the positive voltage pulse at the end of the ON duration of the waveform of the rectangular-wave voltage of the first phase and the application of the negative voltage pulse during the ON duration of the waveform of the rectangular-wave voltage of the second phase are performed at the same timing (e.g., electrical angle ω11-ω12).

With the above process of applying one pair of positive and negative voltage pulses to the phase windings of the two adjacent phases with respect to the reference phase, it is also possible to generate one harmonic component. By performing the application of one pair of positive and negative voltage pulses to the phase windings of the two adjacent phases with respect to the reference phase for each of all the cases where the reference phase is any one of the three phases (rotor positions "2", "4" and "6" in FIG. 15 and electrical angles ω3-ω4, ω7-ω8 and ω11-ω12 in FIG. 16), it is possible to generate the harmonic components three times at equal intervals during each control cycle.

Accordingly, delaying the waveforms of the rectangular-wave voltages for generating the fundamental components of the three phases U, V and W by predetermined durations a while applying opposite pulse voltages to other ones of the three phases for durations corresponding to the predetermined durations a, it is possible to generate the harmonic components six times at equal intervals during each control cycle, thereby exciting the rotor field winding 44 six times at equal intervals during each control cycle.

In the case of the rotor 26 of the rotating electric machine 20 having, for example, four pole pairs, the target number of pulses of the harmonic components per control cycle is equal to 7.2, 6, 5.1 or 4.5 respectively when the rpm of the rotating electric machine 20 is equal to 5000, 6000, 7000 or 8000, as shown in FIG. 12. In this case, in a medium-rotation region where the rpm of the rotating electric machine 20 is higher than or equal to 5000 and lower than or equal to 8000, applying pairs of positive and negative voltage pulses to the stator armature winding 34 six times at equal intervals during each control cycle and thereby exciting the rotor field winding 44 six times at equal intervals during each control cycle, the deviation rate (=(actual frequency of harmonic components)/f1) or (actual frequency of harmonic components)/f2)) of the actual frequency of the harmonic components with respect to the resonance frequencies f1 and f2 of the resonant circuits 80 and 82 of the rotating electric machine 20 is limited to fall within a predetermined range. Specifically, as shown in FIG. 12, the deviation rate is equal to 0.83, 1.00, 1.17 or 1.33 respectively when the rpm of the rotating electric machine 20 is equal to 5000, 6000, 7000 or 8000.

Therefore, when the rpm of the rotating electric machine 20 is in the range of not lower than 5000 and not higher than 8000, exciting the rotor field winding 44 six times at equal intervals during each control cycle, as shown in FIGS. 12 and 13, the actual frequency of the harmonic components is suppressed to fall within the range of approximately ±40% with respect to the resonance frequencies f1 and f2 including the resonance frequencies f1 and f2. With the actual frequency of the harmonic components suppressed to fall within this range, as shown in FIG. 14, the excitation current generated in the rotor field winding 44 becomes higher than or equal to an allowable threshold while having its maximum value when the actual frequency of the harmonic components is equal to the resonance frequencies f1 and f2; the rotational torque generated by the rotating electric machine 20 also becomes higher than or equal to an allowable threshold while having its maximum value when the actual frequency of the harmonic components is equal to the resonance frequencies f1 and f2.

Accordingly, as the harmonic-wave generation process performed in a rectangular-wave control region that is the medium-rotation region where the rpm is not lower than 5000 and not higher than 8000, the control circuit 72 performs, based on the above-described methods, a process of delaying the waveforms of the rectangular-wave voltages for generating the fundamental components of the three phases U, V and W by predetermined durations a and adding opposite pulse voltages to other ones of the three phases for durations corresponding to the predetermined durations a. With the harmonic-wave generation process, in the medium-rotation region, it is possible to generate the harmonic components six times at equal intervals during each control cycle (i.e., 360° in electrical angle), thereby exciting the rotor field winding 44 six times at equal intervals during each control cycle.

Moreover, with the harmonic-wave generation process, in the medium-rotation region where the rpm is not lower than 5000 and not higher than 8000, it is possible to superimpose, on the respective fundamental components in the rectangular-wave form, the harmonic components whose frequency is close to the resonance frequencies f1 and f2 (specifically, within the range of approximately ±40% with respect to the resonance frequencies f1 and f2), regardless of the frequency of the fundamental components.

Furthermore, in the case of the rotor 26 of the rotating electric machine 20 having, for example, four pole pairs, the target number of pulses of the harmonic components per control cycle is equal to 4.5, 4, 3.6, 3 or 2.4 respectively when the rpm of the rotating electric machine 20 is equal to 8000, 9000, 10000, 12000 or 15000, as shown in FIG. 12. In this case, in a high-rotation region where the rpm of the rotating electric machine 20 is higher than 8000 and lower than or equal to 15000, applying pairs of positive and negative voltage pulses to the stator armature winding 34 six times at equal intervals during each control cycle and thereby exciting the rotor field winding 44 six times at equal intervals during each control cycle, the deviation rate of the actual frequency of the harmonic components with respect to the resonance frequencies f1 and f2 falls outside the predetermined range (±40%).

On the other hand, in the high-rotation region where the rpm of the rotating electric machine 20 is higher than 8000 and lower than or equal to 15000, applying pairs of positive and negative voltage pulses to the stator armature winding 34 three times at equal intervals during each control cycle and thereby exciting the rotor field winding 44 three times at equal intervals during each control cycle, the deviation rate of the actual frequency of the harmonic components with respect to the resonance frequencies f1 and f2 is limited to fall within the predetermined range. Specifically, as shown in FIG. 12, the deviation rate is equal to 0.75, 0.83, 1.00 or 1.25 respectively when the rpm of the rotating electric machine 20 is equal to 9000, 10000, 12000 or 15000. In addition, when the rpm is equal to 8000, the deviation rate in the three-time energization is equal to 0.67 whereas the deviation rate in the six-time energization is equal to 1.33; therefore, the difference between the deviation rate in the three-time energization and the deviation rate of 1.00 is equal to the difference between the deviation rate in the six-time energization and the deviation rate of 1.00.

Therefore, when the rpm of the rotating electric machine 20 is in the range of higher than 8000 and lower than or equal to 15000, exciting the rotor field winding 44 three times at equal intervals during each control cycle, as shown in FIGS. 12 and 13, the actual frequency of the harmonic components is suppressed to fall within the range of approximately ±40% with respect to the resonance frequencies f1 and f2 including the resonance frequencies f1 and f2. With the actual frequency of the harmonic components suppressed to fall within this range, as shown in FIG. 14, the excitation current generated in the rotor field winding 44 becomes higher than or equal to the allowable threshold while having its maximum value when the actual frequency of the harmonic components is equal to the resonance frequencies f1 and f2; the rotational torque generated by the rotating electric machine 20 also becomes higher than or equal to the allowable threshold while having its maximum value when the actual frequency of the harmonic components is equal to the resonance frequencies f1 and f2.

Accordingly, as the harmonic-wave generation process performed in a rectangular-wave control region that is the high-rotation region where the rpm is higher than 8000 and lower than or equal to 15000, the control circuit 72 performs, based on the above-described methods, a process of: adding a negative voltage pulse, at the start of an ON duration of the waveform of the rectangular-wave voltage for generating the fundamental component of each of the three phases U, V and W, to cut out the ON duration and thus turn off the voltage for a predetermined duration a; while adding a positive voltage pulse, which is the counterpart of the negative voltage pulse, to an OFF duration of the waveform of the rectangular-wave voltage for generating the fundamental component of either of the remaining two adjacent phases, so as to turn on the voltage for a predetermined duration a. Alternatively, as the harmonic-wave generation process, the control circuit 72 performs a process of: adding a positive voltage pulse, at the end of an ON duration of the waveform of the rectangular-wave voltage for generating the fundamental component of each of the three phases U, V and W, to extend the ON duration and thus further keep the voltage on for a predetermined duration a; while adding a negative voltage pulse, which is the counterpart of the positive voltage pulse, to an ON duration of the waveform of the rectangular-wave voltage for generating the fundamental component of either of the remaining two adjacent phases, so as to turn off the voltage for a predetermined duration a. With the harmonic-wave generation process, in the high-rotation region, it is possible to generate the harmonic components three times at equal intervals during each control cycle (i.e., 360° in electrical angle), thereby exciting the rotor field winding 44 three times at equal intervals during each control cycle.

Moreover, with the harmonic-wave generation process, in the high-rotation region where the rpm is higher than 8000 and lower than or equal to 15000, it is possible to superimpose, on the respective fundamental components in the rectangular-wave form, the harmonic components whose frequency is close to the resonance frequencies f1 and f2 (specifically, within the range of approximately ±40% with respect to the resonance frequencies f1 and f2), regardless of the frequency of the fundamental components.

As above, when the rpm of the rotating electric machine 20 is higher than the medium rotation, it is possible to perform the excitation of the rotor field winding 44 by: superimposing the harmonic components on the respective fundamental components up to six times at equal intervals during each control cycle; and switching, upon the rpm further reaching the high rotation, the number of times superimposing the harmonic components on the respective fundamental components at equal intervals during each control cycle to three. Therefore, from the medium rotation to the high rotation of the rotating electric machine 20, it is possible to lower the impedance of the rotor field winding 44 during the excitation, thereby improving the excitation performance of the rotor field winding 44. Moreover, it is also possible to suppress the amplitude of the harmonic components that are superimposed on the respective fundamental components supplied to the stator armature winding 34, thereby reducing torque ripple caused by the harmonic components for the rotor excitation.

As made clear from the above explanation, the rotating electric machine 20 includes: the stator armature winding 34 wound on the stator core 32; the rotor field winding 44 wound on the rotor core 42; the rectifying element 52 connected to both the ends of the rotor field winding 44; the capacitor 54 having one end connected to one end of the rectifying element 52 and the other end connected between the two ends of the rotor field winding 44; and the control circuit 72 configured to supply the electric currents, each of which includes a fundamental component for generating the rotational torque and a harmonic component having a shorter period than the fundamental component and superimposed on the fundamental component, to the stator armature winding 34 and thereby induce the excitation current in the rotor field winding 44. Moreover, the inductances L1 and L2 of the rotor field winding 44 and the capacitance C of the capacitor 54 are in the resonant relationship with the frequency of the harmonic components of the electric currents.

With the above configuration, when the electric currents, which are obtained by superimposing the harmonic components on the respective fundamental components, are supplied to the stator armature winding 34, it is easy for the field current induced in the rotor field winding 44 to flow. Consequently, it becomes possible to lower the impedance of the rotor field winding 44 during the excitation, thereby improving the excitation performance of the rotor field winding 44. As a result, it becomes possible to reduce torque ripple caused by the harmonic components for the rotor excitation.

In the rotating electric machine 20, each of the harmonic components for the rotor excitation is adjusted in amplitude with its envelope represented by a standing wave whose period is ½ of the period of the fundamental components. With this configuration, it is possible to easily control the amount of the excitation current for exciting the rotor field winding 44.

Moreover, in the rotating electric machine 20, the rotor field winding 44 has the first field winding section 44-1 connected between the other end of the capacitor 54 and the other end of the rectifying element 52 and the second field winding section 44-2 connected in parallel to the capacitor 54. At least one of the first resonance frequency f1 based on the inductance L1 of the first field winding section 44-1 and the capacitance C of the capacitor 54 and the second resonance frequency f2 based on the inductance L2 of the second field winding section 44-2 and the capacitance C of the capacitor 54 is within the predetermined frequency range which includes the frequency of the harmonic components for the rotor excitation, or the frequency of the harmonic components for the rotor excitation is between the first resonance frequency f1 and the second resonance frequency f2.

With the above configuration, when the electric currents, which are obtained by superimposing the harmonic components on the respective fundamental components, are supplied to the stator armature winding 34, it is easy for the field current induced in the first field winding section 44-1 or the second field winding section 44-2 of the rotor field winding 44 to flow. Consequently, it becomes possible to lower the impedance of the rotor field winding 44 during the excitation, thereby improving the excitation performance of the rotor field winding 44.

In the rotating electric machine 20, from the low rotation to the high rotation, the frequency of the harmonic components superimposed on the respective fundamental components, i.e., the frequency at which the pairs of positive and negative voltage pulses are added is within the predetermined frequency range (specifically, the range of, for example, ±40% with respect to the resonance frequencies f1 and f2) which includes the resonance frequencies f1 and f2 based on the inductances L1 and L2 of the rotor field winding 44 and the capacitance C of the capacitor 54 and within which the resultant excitation current or rotational torque is equal to or more than needed (higher than or equal to the threshold). With this configuration, it is possible to superimpose the harmonic components whose frequency is close to the resonance frequencies f1 and f2 on the respective fundamental components from the low rotation to the high rotation regardless of the frequency of the fundamental components. Consequently, it is possible to lower the impedance of the rotor field winding 44 during the excitation, thereby improving the excitation performance of the rotor field winding 44.

In the rotating electric machine 20, in inducing the excitation current in the rotor field winding 44 in the rectangular-wave control region, the control circuit 72 performs the harmonic-wave generation process. In the harmonic-wave generation process, a negative voltage pulse is added, at the start of an ON duration of the waveform of the rectangular-wave voltage for generating the fundamental component applied to the phase winding of one of the three phases, to cut out the ON duration and thus turn off the voltage for a predetermined duration a; meanwhile, a positive voltage pulse, which is the counterpart of the negative voltage pulse, is added to an OFF duration of the waveform of the rectangular-wave voltage for generating the fundamental component applied to the phase winding of either of the remaining two phases, so as to turn on the voltage for a predetermined duration a. Otherwise, in the harmonic-wave generation process, a positive voltage pulse is added, at the end of an ON duration of the waveform of the rectangular-wave voltage for generating the fundamental component applied to the phase winding of one of the three phases, to extend the ON duration and thus further keep the voltage on for a predetermined duration a; meanwhile, a negative voltage pulse, which is the counterpart of the positive voltage pulse, is added to an ON duration of the waveform of the rectangular-wave voltage for generating the fundamental component applied to the phase winding of either of the remaining two phases, so as to turn off the voltage for a predetermined duration a.

With the above configuration, by performing the harmonic-wave generation process of adding pairs of positive and negative voltage pulses to every two adjacent phases, it is possible to create a magnetic field, which is in the same direction as a magnetic field created by supply of the fundamental current, thereby inducing the excitation current in the rotor field winding 44.

In the rotating electric machine 20, in a predetermined rotation region from the medium rotation to the high rotation of the rotating electric machine 20 (specifically, the rotation region where the rpm is higher than or equal to 5000 and lower than or equal to 8000), the control circuit 72 performs the excitation via the rotor field winding 44 six times at equal intervals during each control cycle by performing the harmonic-wave generation process at both the timings of the start and the end of the ON duration of the waveform of the rectangular-wave voltage for each of the phase windings of the three phases. With this configuration, in the predetermined rotation region from the medium rotation to the high rotation of the rotating electric machine 20, it is possible to suppress the frequency of the generated harmonic components to fall within the predetermined range with respect to the resonance frequencies f1 and f2 of the resonant circuits 80 and 82, thereby making the excitation current generated in the rotor field winding 44 and the rotational torque generated by the rotating electric machine 20 higher than or equal to the respective allowable thresholds.

In the rotating electric machine 20, in the high-rotation region of the rotating electric machine 20 (specifically, the region where the rpm is higher than 8000 and lower than or equal to 15000), the control circuit 72 performs the excitation via the rotor field winding 44 three times at equal intervals during each control cycle by performing the harmonic-wave generation process at either of the timings of the start and the end of the ON duration of the waveform of the rectangular-wave voltage for each of the phase windings of the three phases. With this configuration, in the high-rotation region of the rotating electric machine 20, it is possible to suppress the frequency of the generated harmonic components to fall within the predetermined range with respect to the resonance frequencies f1 and f2 of the resonant circuits 80 and 82, thereby making the excitation current generated in the rotor field winding 44 and the rotational torque generated by the rotating electric machine 20 higher than or equal to the respective allowable thresholds.

As above, in the first embodiment, in the rotation regions higher than or equal to the medium rotation of the rotating electric machine 20, the excitation via the rotor field winding 44 is performed six times or three times at equal intervals during each control cycle by performing the harmonic-wave generation process at both or either of the timings of the start and the end of the ON duration of the waveform of the rectangular-wave voltage for each of the phase windings of the three phases. Moreover, when the rpm of the rotating electric machine 20 is in the vicinity of 8000, the number of times of the excitation via the rotor field winding 44 per control cycle is switched between six and three. However, the present disclosure is not limited to the above. In the vicinity of 8000 rpm where the number of times of the excitation per control cycle is switched, if the number of times of the excitation can be set to a number between six and three, it will be possible to make the frequency of the generated harmonic components closer to the resonance frequencies f1 and f2 of the resonant circuits 80 and 82.

Figures 16, 17:
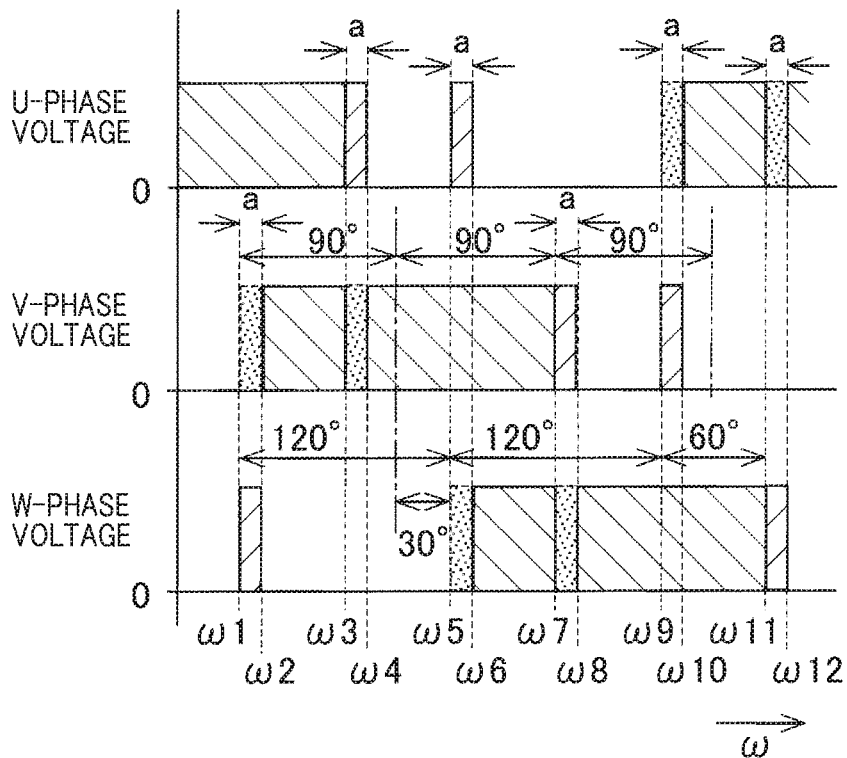
FIG. 16 is a waveform chart showing the waveforms of the phase voltages in the case of generating the harmonic components six times during each control cycle (i.e., 360° in electrical angle) in the field winding type rotating electric machine according to the first embodiment.
FIG. 17 is a table showing the period of the fundamental components supplied to the stator armature winding, the target number of pulses of the harmonic components, the actual number of pulses and the deviation rate of the actual frequency of the harmonic components with respect to the resonance frequency for each rpm value in the case of the rotor having four pole pairs in a field winding type rotating electric machine according to a modification of the first embodiment.

In the case of the rotor 26 of the rotating electric machine 20 having, for example, four pole pairs, the target number of pulses of the harmonic components per control cycle is equal to 5.1, 4.5, 4 or 3.6 respectively when the rpm of the rotating electric machine 20 is equal to 7000, 8000, 9000 or 10000, as shown in FIG. 17. In this case, in the rotation region where the rpm of the rotating electric machine 20 is higher than 7000 and lower than or equal to 10000, applying pairs of positive and negative voltage pulses to the stator armature winding 34 four times at equal intervals during each control cycle and thereby exciting the rotor field winding 44 four times at equal intervals during each control cycle, the deviation rate of the actual frequency of the harmonic components with respect to the resonance frequencies f1 and f2 of the resonant circuits 80 and 82 of the rotating electric machine 20 is limited to fall within the predetermined range. Specifically, as shown in FIG. 17, the deviation rate is equal to 0.89, 1.00 or 1.11 respectively when the rpm of the rotating electric machine 20 is equal to 8000, 9000 or 10000. In addition, when the rpm is equal to 7000, the deviation rate in the four-time energization is equal to 0.78 whereas the deviation rate in the six-time energization is equal to 1.17; therefore, the difference between the deviation rate in the four-time energization and the deviation rate of 1.00 is larger than the difference between the deviation rate in the six-time energization and the deviation rate of 1.00.

Figure 18:
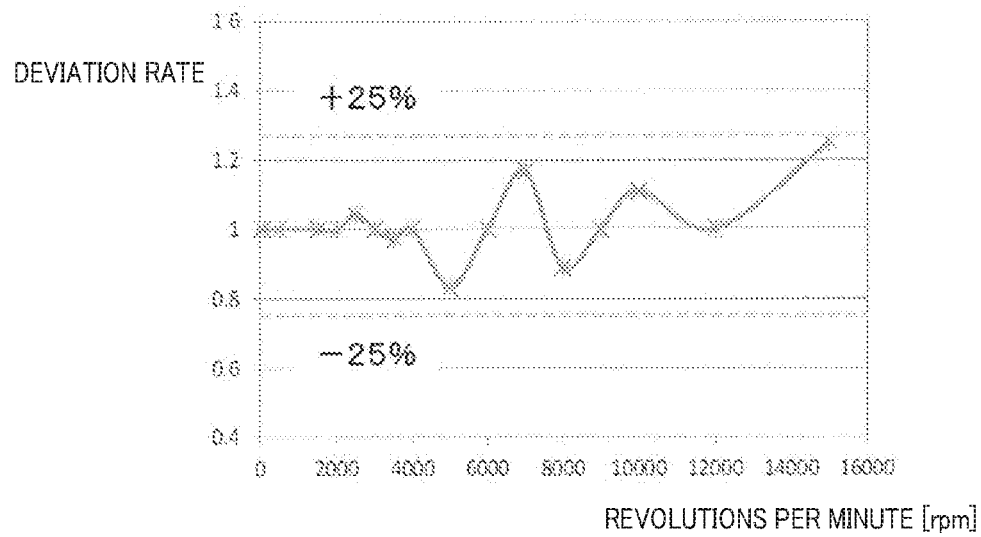
FIG. 18 is a diagram illustrating the relationship between the rpm and the deviation rate shown in FIG. 17.

Therefore, when the rpm of the rotating electric machine 20 is in the range of higher than 7000 and lower than or equal to 10000, exciting the rotor field winding 44 four times at equal intervals during each control cycle, as shown in FIG. 18, the actual frequency of the harmonic components is suppressed to fall within the range of approximately ±25% with respect to the resonance frequencies f1 and f2 including the resonance frequencies f1 and f2. That is, the actual frequency of the harmonic components is suppressed to fall within a narrower range in comparison with the case of performing the six-time energization or the three-time energization when the rpm is higher than 7000 and lower than or equal to 10000. Accordingly, with the actual frequency of the harmonic components suppressed to fall within the above range, the excitation current generated in the rotor field winding 44 becomes higher than or equal to the allowable threshold while having its maximum value when the actual frequency of the harmonic components is equal to the resonance frequencies f1 and f2; the rotational torque generated by the rotating electric machine 20 also becomes higher than or equal to the allowable threshold while having its maximum value when the actual frequency of the harmonic components is equal to the resonance frequencies f1 and f2. In addition, both he excitation current generated in the rotor field winding 44 and the rotational torque generated by the rotating electric machine 20 are increased in comparison with the case of performing the six-time energization or the three-time energization when the rpm is higher than 7000 and lower than or equal to 10000.

Accordingly, as the harmonic-wave generation process performed in a rectangular-wave control region that is the rotation region where the rpm is higher than 7000 and lower than or equal to 10000, the control circuit 72 adds pairs of positive and negative voltage pulses to the waveforms of the rectangular-wave voltages four times at equal intervals during each control cycle so as to make the average value of the applied voltage to each phase during each control cycle zero; the rectangular-wave voltages are for generating the fundamental components applied to the phase windings of two adjacent phases that are circumferentially adjacent to each other.

Specifically, as the harmonic-wave generation process, the control circuit 72 adds a negative voltage pulse, at the start of an ON duration of the waveform of the rectangular-wave voltage for generating the fundamental component applied to the phase winding of a specific one (i.e., the W phase in the example shown in FIG. 19) of the three phases U, V and W, to cut out the ON duration and thus turn off the voltage for a predetermined duration a; meanwhile, the control circuit 72 adds a positive voltage pulse, which is the counterpart of the negative voltage pulse, to an OFF duration of the waveform of the rectangular-wave voltage for generating the fundamental component applied to the phase winding of either of the remaining adjacent phases (i.e., the U phase in the example shown in FIG. 19) so as to turn on the voltage for a predetermined duration a. Moreover, the control circuit 72 adds a positive voltage pulse, at the end of the ON duration of the waveform of the rectangular-wave voltage for generating the fundamental component applied to the phase winding of the specific phase, to extend the ON duration and thus further keep the voltage on for a predetermined duration a; meanwhile, the control circuit 72 adds a negative voltage pulse, which is the counterpart of the positive voltage pulse, to an ON duration of the waveform of the rectangular-wave voltage for generating the fundamental component applied to the phase winding of either of the remaining adjacent phases (i.e., the U phase in the example shown in FIG. 19), so as to turn off the voltage for a predetermined duration a.

Figure 19:
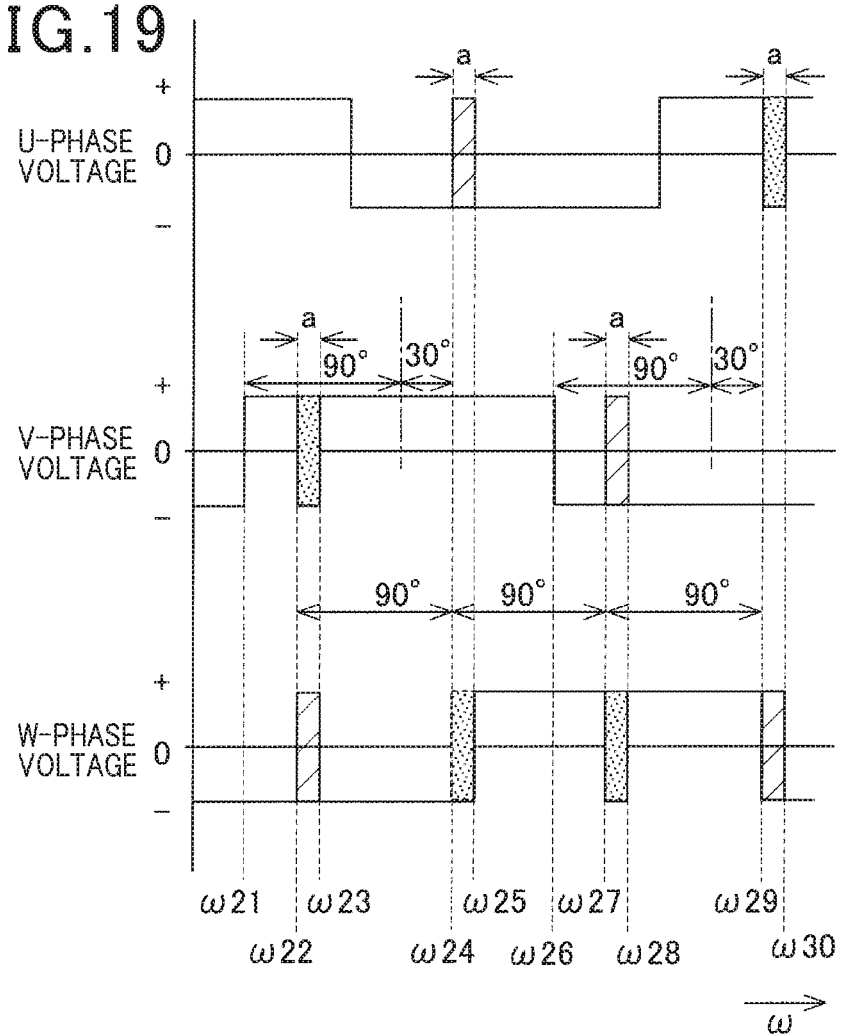
FIG. 19 is a waveform chart showing the waveforms of the phase voltages in the case of generating the harmonic components four times during each control cycle in the field winding type rotating electric machine according to the modification of the first embodiment.

In the above harmonic-wave generation process, pairs of positive and negative voltage pulses are added, at both the timings (i.e., electrical angles ω24-ω25 and ω29-ω30 in the example shown in FIG. 19) of the start and the end of an ON duration of the waveform of the rectangular-wave voltage for generating the fundamental component applied to the phase winding of the specific phase (e.g., the W phase), to the waveforms of the rectangular-wave voltages for generating the fundamental components applied to the phase windings of two adjacent phases including the specific phase. Consequently, the harmonic components are generated twice at equal intervals (i.e., 180° in electrical angle) during each control cycle (i.e., 360° in electrical angle) in the predetermined rotation region.

In addition to the above harmonic-wave generation process, the control circuit 72 further adds pairs of positive and negative voltage pulses, at two timings that are offset by 90° in electrical angle respectively from the timings of the start and the end of the ON duration of the waveform of the rectangular-wave voltage for generating the fundamental component applied to the phase winding of the specific phase (i.e., the timings of adding the pairs of positive and negative voltage pulses to the waveforms of the rectangular-wave voltages for generating the fundamental components applied to the phase windings of two adjacent phases including the specific phase), to the waveforms of the rectangular-wave voltages for generating the fundamental components applied to the phase windings of two adjacent phases (i.e., the V and W phases in the example shown in FIG. 19) to which the pairs of positive and negative voltage pulses can be applied. Here, in the case of the specific phase being the W phase, the two adjacent phases to which the pairs of positive and negative voltage pulses can be applied for the predetermined durations a at the timings offset by 90° in electrical angle are the W and V phases (see also FIG. 15).

With the above addition of the pairs of positive and negative voltage pulses, during each control cycle (i.e., 360° in electrical angle), the harmonic components are generated twice at equal intervals (i.e., 180° in electrical angle) at the timings (i.e., electrical angles ω22-ω23 and ω27-ω28 in the example shown in FIG. 19) offset by 90° in electrical angle respectively from the timings at which the preceding harmonic components have been generated twice at equal intervals in the control cycle.

Accordingly, it is possible to generate the harmonic components four times at equal intervals during each control cycle and thus possible to excite the rotor field winding 44 four times at equal intervals during each control cycle by: delaying the waveform of the rectangular-wave voltage for generating the fundamental component of a specific one of the three phases U, V and W by a predetermined duration a while applying opposite pulse voltages to either of the remaining phases for durations corresponding to the predetermined duration a; and applying pairs of positive and negative voltage pulses, at the timings offset by 90° in electrical angle respectively from the timings of the start and the end of the ON duration of the waveform of the rectangular-wave voltage for generating the fundamental component of the specific phase, to two adjacent phases for predetermined durations a.

With the above-described harmonic-wave generation process, in the rotation region where the rpm is higher than 7000 and lower than or equal to 10000, it is possible to superimpose, on the respective fundamental components in the rectangular-wave form, the harmonic components whose frequency is close to the resonance frequencies f1 and f2 (specifically, within the range of approximately ±25% with respect to the resonance frequencies f1 and f2), regardless of the frequency of the fundamental components. Consequently, in the rotation region where the rpm is higher than 7000 and lower than or equal to 10000, it becomes possible to make the frequency of the generated harmonic components closer to the resonance frequencies f1 and f2 in comparison of the above-described first embodiment according to which the harmonic components are generated six times or three times at equal intervals during each control cycle.

According to the above modification, it is possible to perform the excitation of the rotor field winding 44 by: superimposing the harmonic components on the respective fundamental components up to six times at equal intervals during each control cycle when the rpm of the rotating electric machine 20 is higher than the medium rotation; switching, upon the rpm reaching the predetermined high rotation, the number of times superimposing the harmonic components on the respective fundamental components at equal intervals during each control cycle to four; and further switching, upon the rpm reaching a higher predetermined high rotation, the number of times superimposing the harmonic components on the respective fundamental components at equal intervals during each control cycle to three.

Therefore, according to the above modification, from the medium rotation to the high rotation of the rotating electric machine 20, it is possible to further lower the impedance of the rotor field winding 44 during the excitation, thereby further improving the excitation performance of the rotor field winding 44 in comparison with the first embodiment. Moreover, it is also possible to further suppress the amplitude of the harmonic components that are superimposed on the respective fundamental components supplied to the stator armature winding 34, thereby further reducing torque ripple caused by the harmonic components for the rotor excitation.

In addition, in the above-described first embodiment and modification, examples are illustrated where the rotor 26 of the rotating electric machine 20 has four pole pairs. However, the present disclosure is not limited to the above, but can also be applied to the case of the rotor 26 having a different number of pole pairs.

Moreover, in the above-described first embodiment, a timing for applying a pair of positive and negative voltage pulses for superimposing the harmonic component on the fundamental component supplied to the reference phase is set to a timing delayed by 30° in electrical angle from the center of an ON duration (a positive voltage center) or the center of an OFF duration (a negative voltage center) of the waveform of the rectangular-wave voltage for generating the fundamental component applied to the phase winding of the reference phase, i.e., to the start or the end of an ON duration of the waveform of the rectangular-wave voltage for generating the fundamental component applied to the phase winding of a different phase from the reference phase. However, the present disclosure is not limited to the above. A timing for applying a pair of positive and negative voltage pulses may be set to a timing delayed by 30°-60° in electrical angle from a positive voltage center or a negative voltage center of the reference phase. In addition, in the rotating electric machine 20, the power factor is approximately higher than or equal to 0.5 and thus the power factor angle is approximately less than or equal to 60° in electrical angle. Therefore, it is preferable for the upper limit of the electrical angle range to be set to 60° in electrical angle.

Moreover, in the above-described first embodiment, the resonance frequencies f1 and f2 of the resonant circuits 80 and 82, which are formed of the rotor field winding 44 and the capacitor 54, are defined as a resonance frequency of the field winding type rotating electric machine 20. However, in the case of varying the frequency of the harmonic components while supplying electric currents, which are obtained by superimposing the harmonic components on the respective fundamental components, to the stator armature winding 34, the resonance frequency of the field winding type rotating electric machine 20 may be set to a frequency at which the excitation current generated in the rotor field winding 44 or the rotational torque generated with the excitation current reaches its peak (see FIG. 14).

Second Embodiment

Figure 20:
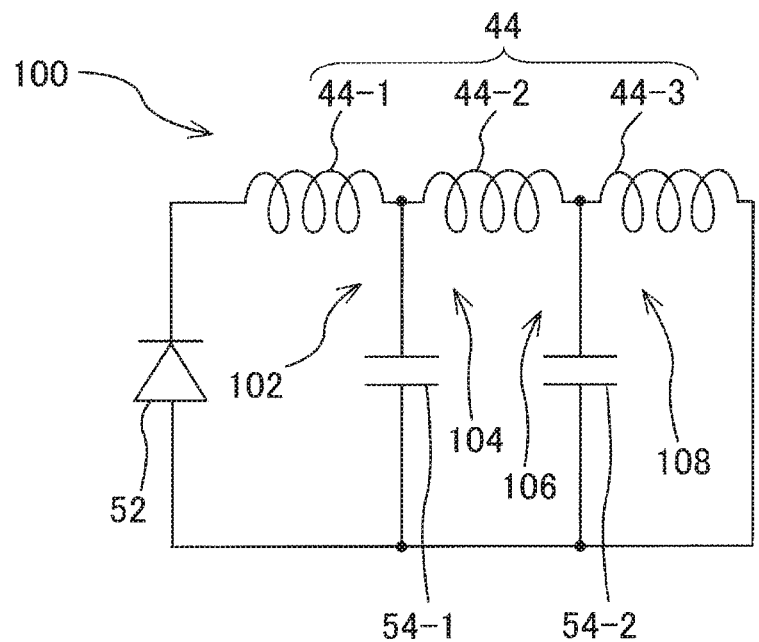
FIG. 20 is a circuit diagram of an essential part, including a rotor field winding, of a field winding type rotating electric machine according to a second embodiment.

In the above-described rotating electric machine 20 according to the first embodiment, the rotor field winding 44 includes the two field winding sections 44-1 and 44-2 that are connected in series with each other; there is provided the single capacitor 54 the other end of which is connected to the junction point between the field winding sections 44-1 and 44-2. In contrast, in a rotating electric machine 100 according to the second embodiment, as shown in FIG. 20, the rotor field winding 44 includes three field winding sections 44-1, 44-2 and 44-3 that are connected in series with each other; there are provided two capacitors 54-1 and 54-2 each of which has the other end thereof connected to a corresponding one of the junction points between the field winding sections 44-1, 44-2 and 44-3.

Hereinafter, for the sake of convenience, the field winding sections 44-1, 44-2 and 44-3 will be respectively referred to as first field winding section 44-1, second field winding section 44-2 and third field winding section 44-3; the capacitors 54-1 and 54-2 will be respectively referred to as first capacitor unit 54-1 and second capacitor unit 54-2. In addition, in FIGS. 20 and 21, components identical to those employed in the first embodiment are marked with the same reference numerals and description thereof is omitted or simplified.

Each of the capacitors 54-1 and 54-2 has one end connected to both the anode terminal of the rectifying element 52 and one end of the third field winding section 44-3 and the other end connected between the two ends of the rotor field winding 44. Specifically, the other end of the first capacitor unit 54-1 is connected to the junction point between the first field winding section 44-1 and the second field winding section 44-2; the other end of the second capacitor unit 54-2 is connected to the junction point between the second field winding section 44-2 and the third field winding section 44-3. The first capacitor unit 54-1 has a capacitance C1. The second capacitor unit 54-2 has a capacitance C2.

The first field winding section 44-1 is connected between the cathode terminal of the rectifying element 52 and the other end of the first capacitor unit 54-1. The second field winding section 44-2 is connected between the other end of the first capacitor unit 54-1 and the other end of the second capacitor unit 54-2. The third field winding section 44-3 is connected in parallel to the second capacitor unit 54-2. The first capacitor unit 54-1 has a function of storing, when the direction of a voltage generated between the two ends of the first field winding section 44-1 and the direction of a voltage generated on the second field winding section 44-2 side are opposite to each other and thus the two voltages cancel each other, excitation energy corresponding to the mutually-canceling voltages. The second capacitor unit 54-2 has a function of storing, when the direction of the voltage generated on the second field winding section 44-2 side and the direction of a voltage generated on the third field winding section 44-3 side are opposite to each other and thus the two voltages cancel each other, excitation energy corresponding to the mutually-canceling voltages.

The junction point between the first field winding section 44-1 and the second field winding section 44-2 and the junction point between the second field winding section 44-2 and the third field winding section 44-3 may be set to positions where the rotor field winding 44 is divided stepwise into sections more susceptible to the leakage magnetic flux and/or the harmonic magnetic flux and sections more impervious to the leakage magnetic flux and/or the harmonic magnetic flux. The first field winding section 44-1 has an inductance L1. The second field winding section 44-2 has an inductance L2. The third field winding section 44-3 has an inductance L3.

Figure 21:
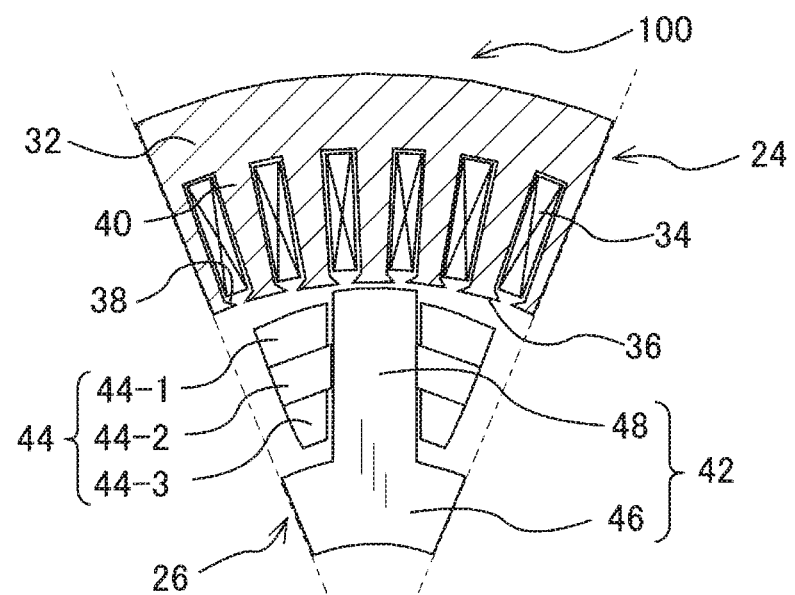
FIG. 21 is a cross-sectional view taken by cutting the field winding type rotating electric machine according to the second embodiment along a plane extending perpendicular to a rotating shaft.

As shown in FIG. 21, on each of the salient pole portions 48, the first field winding section 44-1, the second field winding section 44-2 and the third field winding section 44-3 are arranged in the radial direction in this order from the side closer to the stator core 32. That is, the first field winding section 44-1 is arranged closer to the stator core 32 (i.e., more radially outward) than the second field winding section 44-2 is; the second field winding section 44-2 is arranged closer to the stator core 32 (i.e., more radially outward) than the third field winding section 44-3 is.

In the rotating electric machine 100, there are four resonant circuits formed of the three field winding sections 44-1, 44-2 and 44-3 of the rotor field winding 44 and the two capacitor units 54-1 and 54-2. That is, the first field winding section 44-1 of the rotor field winding 44 and the first capacitor unit 54-1 together form a first resonant circuit 102. The first resonant circuit 102 has a first resonance frequency f11. The first resonance frequency f11 can be calculated based on the inductance L1 of the first field winding section 44-1 and the capacitance C1 of the first capacitor unit 54-1 by the following Equation (3).

The second field winding section 44-2 of the rotor field winding 44 and the first capacitor unit 54-1 together form a second resonant circuit 104. The second resonant circuit 104 has a second resonance frequency f12. The second resonance frequency f12 can be calculated based on the inductance L2 of the second field winding section 44-2 and the capacitance C1 of the first capacitor unit 54-1 by the following Equation (4).

The second field winding section 44-2 of the rotor field winding 44 and the second capacitor unit 54-2 together form a third resonant circuit 106. The third resonant circuit 106 has a third resonance frequency f13. The third resonance frequency f13 can be calculated based on the inductance L2 of the second field winding section 44-2 and the capacitance C2 of the second capacitor unit 54-2 by the following Equation (5).

The third field winding section 44-3 of the rotor field winding 44 and the second capacitor unit 54-2 together form a fourth resonant circuit 108. The fourth resonant circuit 108 has a fourth resonance frequency f14. The fourth resonance frequency f14 can be calculated based on the inductance L3 of the third field winding section 44-3 and the capacitance C2 of the second capacitor unit 54-2 by the following Equation (6).

$$f11 = 1/(2 \times \pi \times (L1 \times C1)^{1/2}) \quad (3)$$

$$f12 = 1/(2 \times \pi \times (L2 \times C1)^{1/2}) \quad (4)$$

$$f13 = 1/(2 \times \pi \times (L2 \times C2)^{1/2}) \quad (5)$$

$$f14 = 1/(2 \times \pi \times (L3 \times C2)^{1/2}) \quad (6)$$

The inductance L1 of the first field winding section 44-1 and the capacitance C1 of the first capacitor unit 54-1 are in a resonant relationship with the frequency of the harmonic components for the rotor excitation. Otherwise, the inductance L2 of the second field winding section 44-2 and the capacitance C1 of the first capacitor unit 54-1 are in a resonant relationship with the frequency of the harmonic components. Otherwise, the inductance L2 of the second field winding section 44-2 and the capacitance C2 of the second capacitor unit 54-2 are in a resonant relationship with the frequency of the harmonic components for the rotor excitation. Otherwise, the inductance L3 of the third field winding section 44-3 and the capacitance C2 of the second capacitor unit 54-2 are in a resonant relationship with the frequency of the harmonic components.

That is, there are provided four resonance frequencies respectively corresponding to the four resonant circuits 102-108. At least one of the first resonance frequency f11, the second resonance frequency f12, the third resonance frequency f13 and the fourth resonance frequency f14 is equal to or in the vicinity of the frequency of the harmonic components. In addition, all of the first resonance frequency f11, the second resonance frequency f12, the third resonance frequency f13 and the fourth resonance frequency f14 may be set to be equal to or in the vicinity of the frequency of the harmonic components.

Moreover, the resonance frequencies f11-f14 of the resonant circuits 102-108 may be set to be different from each other, thereby expanding the resonance frequency band. This configuration makes it easier to bring the frequency of the harmonic components into agreement with the resonance frequencies f11-f14 of the resonant circuits 102-108. Furthermore, in this case, when any two of the four resonance frequencies f11-f14 are approximate to each other and resonance occurs at a frequency between the two resonance frequencies, the frequency of the harmonic components may be set to fall between the two resonance frequencies. This configuration makes it easier to bring the frequency of the harmonic components into agreement with a frequency between the two resonance frequencies.

With at least one of the first resonance frequency f11, the second resonance frequency f12, the third resonance frequency f13 and the fourth resonance frequency f14 being in a resonant relationship with the frequency of the harmonic components, it is possible to facilitate flow of the field current in comparison with the case of none of the resonance frequencies f11-f14 being in a resonant relationship with the frequency of the harmonic components; the field current is induced in the rotor field winding 44 on each pole when electric currents, which are obtained by superimposing the harmonic components on the respective fundamental components, are supplied to the stator armature winding 34. Consequently, in the rotating electric machine 100, it is possible to lower the impedance of the rotor field winding 44 during the excitation, thereby improving the excitation performance of the rotor field winding 44. As a result, it is possible to reduce torque ripple caused by the harmonic components for the rotor excitation.

Third Embodiment

Figure 22:
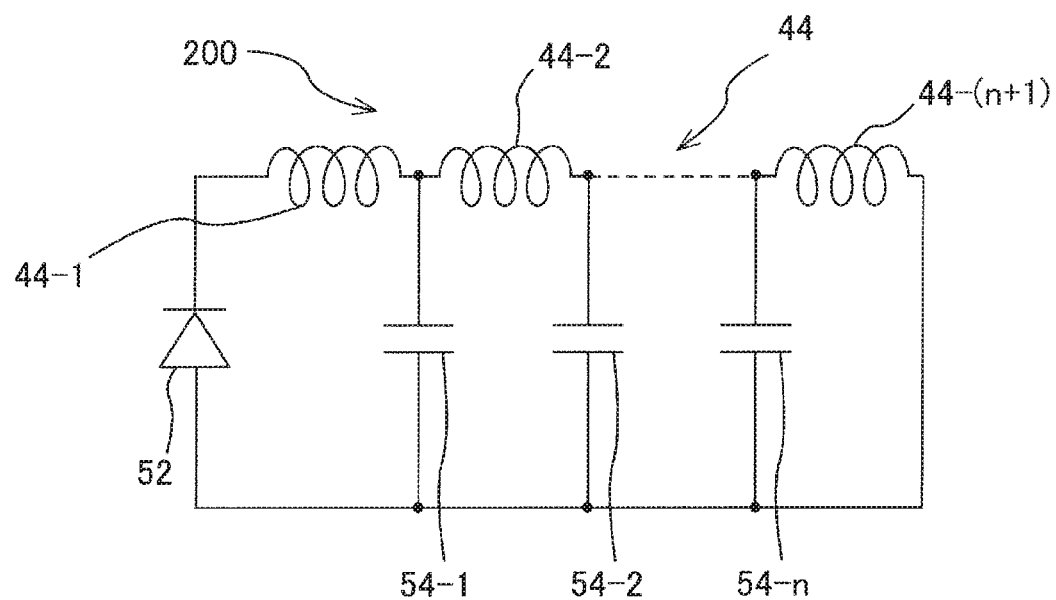
FIG. 22 is a circuit diagram of an essential part, including a rotor field winding, of a field winding type rotating electric machine according to a third embodiment.

In the above-described rotating electric machine 100 according to the second embodiment, the rotor field winding 44 includes the three field winding sections 44-1, 44-2 and 44-3 that are connected in series with each other; there are provided the two capacitors 54-1 and 54-2 each of which has the other end thereof connected to a corresponding one of the junction points between the field winding sections 44-1, 44-2 and 44-3. In contrast, in a rotating electric machine 200 according to the third embodiment, as shown in FIG. 22, the rotor field winding 44 includes (n+1) field winding sections 44-1, 44-2, . . . , and 44-(N+1) that are connected in series with each other; there are provided n capacitor units 54-1, 54-2, . . . , and 54-n each of which has the other end thereof connected to a corresponding one of the junction points between the field winding sections 44-1, 44-2, . . . , and 44-(N+1). In addition, n may be an integer greater than or equal to 3; however, in the case of encompassing the first and second embodiments, n may be an integer greater than or equal to 1. Moreover, in FIG. 22, components identical to those employed in the first embodiment are marked with the same reference numerals and description thereof is omitted or simplified.

In the rotating electric machine 200, there are (2×n) resonant circuits formed of the (n+1) field winding sections 44-1-44-(N+1) of the rotor field winding 44 and the n capacitor units 54-1-54-n. In other words, the (n+1) field winding sections 44-1-44-(N+1) of the rotor field winding 44 and the n capacitor units 54-1-54-n together form (2×n) resonant circuits. The (n+1) field winding sections 44-1-44-(N+1) respectively have inductances L1-L(n+1). The n capacitor units 54-1-54-n respectively have capacitances C1-Cn. At least one of the resonance frequencies of the (2×n) resonant circuits is equal to or in the vicinity of the frequency of the harmonic components for the rotor excitation. In addition, all of the resonance frequencies of the (2×n) resonant circuits may be set to be equal to or in the vicinity of the frequency of the harmonic components.

Moreover, the resonance frequencies of the (2×n) resonant circuits may be set to be different from each other, thereby expanding the resonance frequency band to have a given bandwidth. This configuration makes it easier to bring the frequency of the harmonic components into agreement with any of the resonance frequencies of the resonant circuits. Furthermore, in this case, when any two of the (2×n) resonance frequencies are approximate to each other and resonance occurs at a frequency between the two resonance frequencies, the frequency of the harmonic components may be set to fall between the two resonance frequencies. This configuration makes it easier to bring the frequency of the harmonic components into agreement with a frequency between the two resonance frequencies.

With the resonance frequencies of the resonant circuits being in a resonant relationship with the frequency of the harmonic components, it is possible to facilitate flow of the field current in comparison with the case of none of the resonance frequencies being in a resonant relationship with the frequency of the harmonic components; the field current is induced in the rotor field winding 44 on each pole when electric currents, which are obtained by superimposing the harmonic components on the respective fundamental components, are supplied to the stator armature winding 34. Consequently, in the rotating electric machine 200, it is possible to lower the impedance of the rotor field winding 44 during the excitation, thereby improving the excitation performance of the rotor field winding 44. As a result, it is possible to reduce torque ripple caused by the harmonic components for the rotor excitation.

[Others]

In the above-described first embodiment, on each of the salient pole portions 48, the first field winding section 44-1, which is connected between the cathode terminal of the rectifying element 52 and the other end of the capacitor 54, is arranged on the side closer to the stator core 32 in the radial direction; the second field winding section 44-2, which is connected in parallel to the capacitor 54, is arranged on the side further from the stator core 32 in the radial direction. That is, the first field winding section 44-1 is arranged closer to the stator core 32 (i.e., more radially outward) than the second field winding section 44-2 is. However, the present disclosure is not limited to the above arrangement. In contrast, on each of the salient pole portions 48, the first field winding section 44-1 may be arranged on the side further from the stator core 32 in the radial direction; the second field winding section 44-2 may be arranged on the side closer to the stator core 32 in the radial direction. That is, the first field winding section 44-1 may be arranged further from the stator core 32 (i.e., more radially inward) than the second field winding section 44-2 is. In addition, the same configuration can also be applied to the second and third embodiments.

First Modification

The magnetic flux flowing to the field poles includes leakage magnetic flux. Moreover, the leakage magnetic flux includes magnetic flux which flows between the stator 24 and the rotor 26 without passing through the salient pole portions 48 that are the main magnetic poles. Therefore, the formation of efficient magnetic flux may be inhibited.

Figure 23:
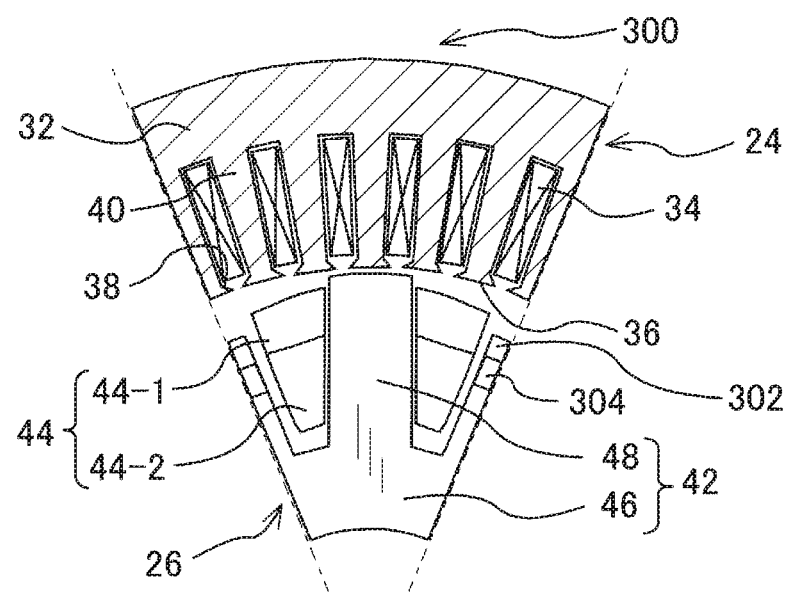
FIG. 23 is a cross-sectional view taken by cutting a field winding type rotating electric machine according to a first modification along a plane extending perpendicular to a rotating shaft.

In view of the above, in a rotating electric machine 300 according to the first modification, as shown in FIG. 23, the rotor core 42 further has a plurality of auxiliary pole portions 302 in addition to the boss portion 46 and the salient pole portions 48. Specifically, the salient pole portions 48 are the main magnetic poles that constitute the field poles (specifically, N poles and S poles). Each of the auxiliary pole portions 302 is formed between one pair of the salient pole portions 48. The auxiliary pole portions 302 are arranged at predetermined intervals in the circumferential direction so as to be aligned alternately with the salient pole portions 48. The auxiliary pole portions 302 are auxiliary magnetic poles arranged to provide boundaries between circumferentially-adjacent salient pole portions 48. The auxiliary pole portions 302 protrude radially outward from the boss portion 46. In addition, in FIG. 23, components identical to those employed in the first embodiment are marked with the same reference numerals and description thereof is omitted or simplified.

The auxiliary pole portions 302 may be formed to have a smaller circumferential width than the salient pole portions 48. Moreover, the gaps between the distal ends of the auxiliary pole portions 302 and the distal ends of the teeth 40 of the stator core 32 may be formed to be greater than the air gaps between the distal ends of the salient pole portions 48 and the distal ends of the teeth 40.

The rotating electric machine 300 has magnets 304 provided in the auxiliary pole portions 302. The magnets 304 are magnetized in directions canceling the leakage magnetic flux that flows between the stator 24 and the rotor 26 at positions between the salient pole portions 48 (or arranged so as to be magnetized in such directions). For example, the magnets 304 are embedded in the auxiliary pole portions 302 to have the N poles thereof located on the radially inner side and the S poles thereof located on the radially outer side. The magnets 304 have a function of suppressing magnetic flux from leaking, at positions between the salient pole portions 48, across the gaps between the stator 24 and the rotor 26.

With the above structure of the rotating electric machine 300, it is possible to suppress, by the magnets 304 provided in the auxiliary pole portions 302, magnetic flux from flowing between the stator 24 and the rotor 26 without passing through the salient pole portions 48 (i.e., the main magnetic poles). Consequently, it is possible to cause the magnetic flux flowing to the field cores to efficiently pass through the main magnetic poles, thereby effectively generating the field current.

In addition, the magnets 304 may be implemented by either permanent magnets or electromagnets. In the later case, windings are wound on the auxiliary pole portions 302 to generate magnetic flux in a direction canceling the leakage magnetic flux flowing from the stator 24 to the rotor 26.

Second Modification

Figure 24:
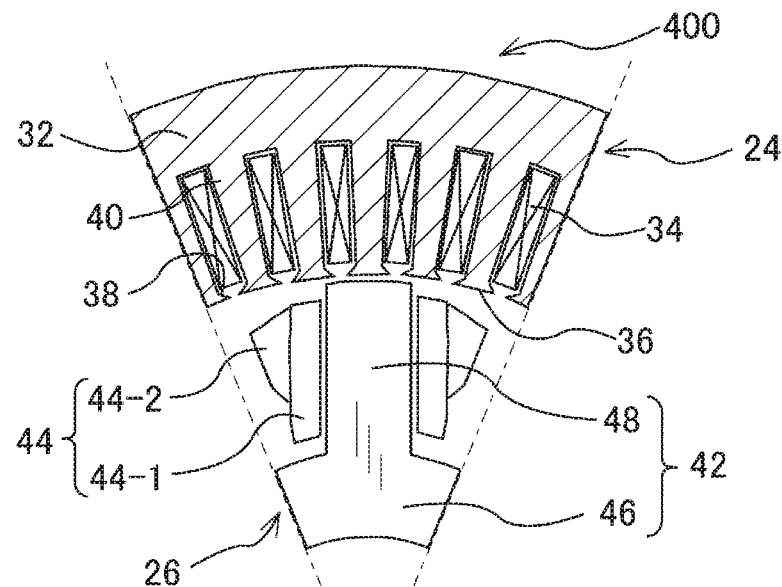
FIG. 24 is a cross-sectional view taken by cutting a field winding type rotating electric machine according to a second modification along a plane extending perpendicular to a rotating shaft.

In the above-described embodiments and modifications, the serially-connected field winding sections of the rotor field winding 44 are arranged on the salient pole portions 48 in radial alignment with each other. However, the present disclosure is not limited to the above. Alternatively, the serially-connected field winding sections of the rotor field winding 44 may be arranged on the salient pole portions 48 in circumferential alignment with each other. Specifically, in a rotating electric machine 400 according to the second modification, as shown in FIG. 24, on each of the salient pole portions 48, the first field winding section 44-1 connected between the cathode terminal of the rectifying element 52 and the other end of the capacitor 54 is arranged on the side closer to the salient pole portion 48 in the circumferential direction; the second field winding section 44-2 connected in parallel to the capacitor 54 is arranged on the side further from the salient pole portion 48 in the circumferential direction. That is, the first field winding section 44-1 is arranged closer than the second field winding section 44-2 to the salient pole portion 48 in the circumferential direction. Moreover, in FIG. 24, components identical to those employed in the first embodiment are marked with the same reference numerals and description thereof is omitted or simplified.

The above arrangement of the first field winding section 44-1 and the second field winding section 44-2 may be realized by, for example, winding the first field winding section 44-1 on each of the salient pole portions 48 of the rotor core 42 and then winding the second field winding section 44-2 on the circumferentially outer side of the first field winding section 44-1. Moreover, the first field winding section 44-1 and the second field winding section 44-2 may be two sections of a single winding which are demarcated from each other at the connection position between the rotor field winding 44 and the other end of the capacitor 54; alternatively, the first field winding section 44-1 and the second field winding section 44-2 may be implemented by connecting two separate windings at the connection position between the rotor field winding 44 and the other end of the capacitor 54.

With the above structure of the rotating electric machine 400, it is possible to increase the energy stored in the capacitor 54 by an amount corresponding to the difference in the amount of magnetic flux between the side closer to the salient pole portion 48 (i.e., the main magnetic pole side) and the side further from the salient pole portion 48 (i.e., the inter-main magnetic pole space side), thereby more effectively generating the field current.

In addition, in the above-described second modification, on each of the salient pole portions 48, the first field winding section 44-1 is arranged closer than the second field winding section 44-2 to the salient pole portion 48 in the circumferential direction. However, the present disclosure is not limited to the above arrangement. In contrast, on each of the salient pole portions 48, the first field winding section 44-1 may be arranged on the side further from the salient pole portion 48 in the circumferential direction; the second field winding section 44-2 may be arranged on the side closer to the salient pole portion 48 in the circumferential direction. That is, the first field winding section 44-1 may be arranged further than the second field winding section 44-2 from the salient pole portion 48 in the circumferential direction.

Third Modification

Figure 25:
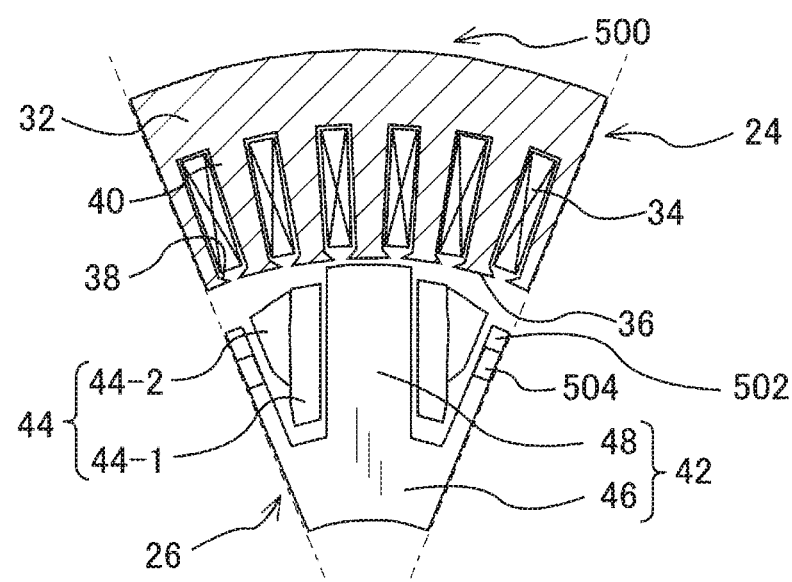
FIG. 25 is a cross-sectional view taken by cutting a field winding type rotating electric machine according to a third modification along a plane extending perpendicular to a rotating shaft.

In above-described second modification, there are provided neither auxiliary pole portions nor magnets provided in auxiliary pole portions illustrated in the first modification. In contrast, in a rotating electric machine 500 according to the third modification, as shown in FIG. 25, the rotor core 42 further has a plurality of auxiliary pole portions 502 identical to the auxiliary pole portions 302 in the first modification and a plurality of magnets 504 identical to the magnets 304 in the first modification. In addition, in FIG. 25, components identical to those employed in the first embodiment are marked with the same reference numerals and description thereof is omitted or simplified. With the above structure, it is possible to suppress, by the magnets 504 provided in the auxiliary pole portions 502, magnetic flux from flowing between the stator 24 and the rotor 26 without passing through the salient pole portions 48 (i.e., the main magnetic poles). Consequently, it is possible to cause the magnetic flux flowing to the field cores to efficiently pass through the main magnetic poles, thereby effectively generating the field current.

In addition, the magnets 504 may be implemented by either permanent magnets or electromagnets. In the later case, windings are wound on the auxiliary pole portions 502 to generate magnetic flux in a direction canceling the leakage magnetic flux flowing from the stator 24 to the rotor 26.

Fourth Modification

Figure 26:
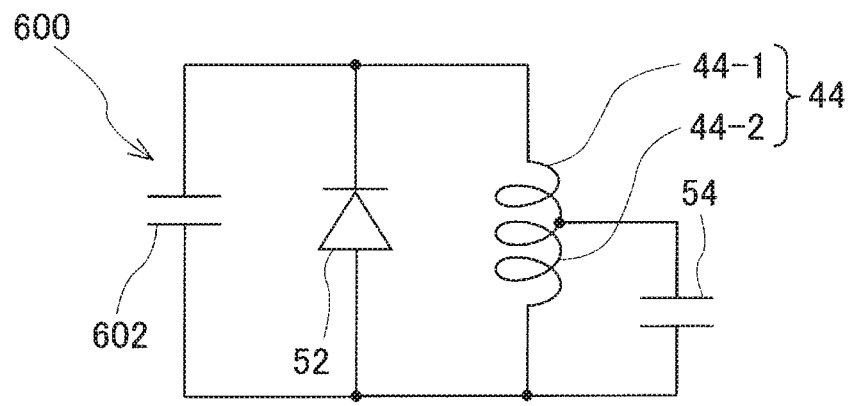
FIG. 26 is a circuit diagram of an essential part, including a rotor field winding, of a field winding type rotating electric machine according to a fourth modification.

In the above-described embodiments and modifications, no capacitor is connected in parallel to the rectifying element 52 in the rotating electric machine 20. In contrast, in a rotating electric machine 600 according to the fourth modification, as shown in FIG. 26, a capacitor 602 is connected in parallel to the rectifying element 52. In addition, in FIG. 26, components identical to those employed in the first embodiment are marked with the same reference numerals and description thereof is omitted or simplified. The capacitor 602 has a function of smoothing the AC voltage, which is induced in the rotor field winding 44 and half-wave rectified by the rectifying element 52, and thereby reducing pulsation in the voltage. Consequently, in the rotating electric machine 600 provided with the capacitor 602, it is possible to smooth the AC voltage half-wave rectified by the rectifying element 52, thereby reducing pulsation in the voltage.

Fifth Modification

Figure 27:
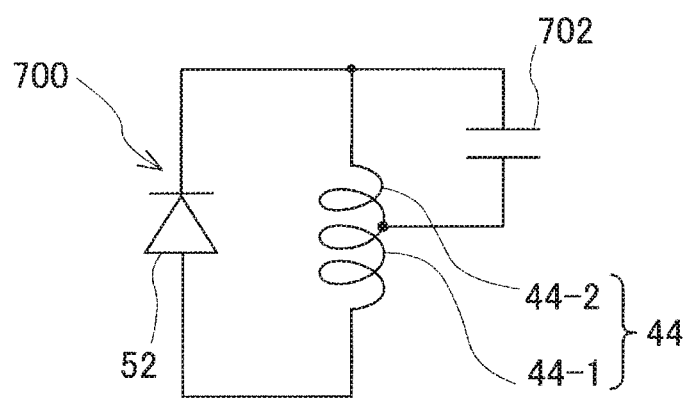
FIG. 27 is a circuit diagram of an essential part, including a rotor field winding, of a field winding type rotating electric machine according to a fifth modification.

In the above-described embodiments and modifications, there is provided the capacitor 54 that has one end connected to the anode terminal of the rectifying element 52 and the other end connected between the two ends of the rotor field winding 44. In contrast, in a rotating electric machine 700 according to the fifth modification, there is provided a capacitor 702 instead of the capacitor 54 in the first embodiment. As shown in FIG. 27, the capacitor 702 has one end connected to the cathode terminal of the rectifying element 52 and the other end connected between the two ends of the rotor field winding 44.

The rotor field winding 44 has a first field winding section 44-1 connected between the anode terminal of the rectifying element 52 and the other end of the capacitor 702 and a second field winding section 44-2 connected in parallel to the capacitor 702. The capacitor 702 has a function of storing, when the direction of a voltage generated between the two ends of the first field winding section 44-1 and the direction of a voltage generated between the two ends of the second field winding section 44-2 are opposite to each other and thus the two voltages are in mutually-canceling directions, energy corresponding to the mutually-canceling voltages.

In the above rotating electric machine 700, the voltages may be applied so that: the directions of the voltages applied to the first and second field winding sections 44-1 and 44-2 are opposite to each other and thus are mutually-canceling directions; and electric currents flow in the first and second field winding sections 44-1 and 44-2 from those ends of the field winding sections 44-1 and 44-2 which are connected to the rectifying element 52 to those ends of the field winding sections 44-1 and 44-2 which are connected to the other end of the capacitor 702 (i.e., the pattern 2). In this case, the electric currents flow through the first and second field winding sections 44-1 and 44-2 to the capacitor 702. Consequently, excitation energy corresponding to the mutually-canceling voltages is stored in the capacitor 54, thereby charging the capacitor 702.

After the charge of the capacitor 702, the voltage directions of the first and second field winding sections 44-1 and 44-2 may be switched so that: the voltages are applied in mutually-canceling directions; and electric currents flow in the first and second field winding sections 44-1 and 44-2 from those ends of the field winding sections 44-1 and 44-2 which are connected to the other end of the capacitor 702 to those ends of the field winding sections 44-1 and 44-2 which are connected to the rectifying element 52 (i.e., the pattern 3). In this case, electric current flows from the capacitor 702 to the field winding sections 44-1 and 44-2. Consequently, the energy stored in the capacitor 702 is charged to the field winding sections 44-1 and 44-2, thereby discharging the capacitor 702. Thereafter, the charge and discharge of the capacitor 702 may be repeated.

Accordingly, in the rotating electric machine 700 according to the fifth modification, when voltages are generated in mutually-canceling directions in the field winding sections 44-1 and 44-2 of the rotor field winding 44, it is possible to efficiently convert the excitation energy generated in the rotor field winding 44 into the excitation current, thereby securing the field current. Hence, it is possible to prevent a loss of the excitation energy from occurring due to reduction in the excitation current when voltages are generated in mutually-canceling directions in the field winding sections 44-1 and 44-2 of the rotor field winding 44. Consequently, it is possible to efficiently excite the rotor core 42 even when a situation occurs where the voltages cancel each other. That is, it is possible to achieve the same effects as achievable according to the first embodiment.

Moreover, the configuration according to the fifth modification can also be applied to the rotating electric machine 100 according to the second embodiment which is shown in FIG. 20 and the rotating electric machine 200 according to the third embodiment which is shown in FIG. 22. That is, in the rotating electric machines 100 and 200, each of the capacitor units may have one end connected to the cathode terminal of the rectifying element 52 and the other end connected between the two ends of the rotor field winding 44.

In addition, in the above-described second and third embodiments and modifications, as in the first embodiment, in terms of making the excitation current generated in the rotor field winding or the torque of the rotating electric machine higher than or equal to the predetermined value, it is preferable to keep the frequency of the harmonic components superimposed on the respective fundamental components within the predetermined frequency range, which includes the resonance frequencies, from the low rotation to the high rotation of the rotating electric machine. Moreover, in this case, to generate the harmonic components and thereby induce the excitation current in the rotor field winding in the rectangular-wave control region, the harmonic-wave generation process may be performed to apply pairs of positive and negative voltage pulses to two adjacent phases as in the first embodiment.

Moreover, in the above-described embodiments and modifications, the rotor field winding 44 is concentratedly wound on each of the salient pole portions 48. However, the present disclosure is not limited to the above, but can also be applied to the case of the rotor field winding 44 being distributedly wound on the salient pole portions 48.

Furthermore, in the above-described embodiments and modifications, the capacitor may be constituted of a plurality of capacitors that are mutually connected serially, parallel or both serially and parallel. In addition, it is preferable for the capacitor to be implemented by a ceramic capacitor.

In addition, the present disclosure is not limited to the above-described embodiments and modifications, and various further modifications may be made without departing from the spirit of the present disclosure.

What is claimed is:

1. A field winding type rotating electric machine comprising:
   a stator armature winding wound on a stator core;
   a rotor field winding wound on a rotor core;
   a rectifying element connected to both ends of the rotor field winding;
   a capacitor having one end connected to one end of the rectifying element and the other end connected between the two ends of the rotor field winding; and
   a control circuit configured to supply electric current, which includes a fundamental component for generating rotational torque and a harmonic component having a shorter period than the fundamental component and superimposed on the fundamental component, to the stator armature winding and thereby induce excitation current in the rotor field winding,
   wherein
   an inductance of the rotor field winding and a capacitance of the capacitor are in a resonant relationship with a frequency of the harmonic component.

2. The field winding type rotating electric machine as set forth in claim 1, wherein the harmonic component is adjusted in amplitude with its envelope represented by a standing wave whose period is ½ of a period of the fundamental component.

3. The field winding type rotating electric machine as set forth in claim 1, wherein the rotor field winding has a first field winding section connected between the other end of the capacitor and the other end of the rectifying element and a second field winding section connected in parallel to the capacitor, and
   at least one of a first resonance frequency based on an inductance of the first field winding section and the capacitance of the capacitor and a second resonance frequency based on an inductance of the second field winding section and the capacitance of the capacitor is within a predetermined frequency range which includes the frequency of the harmonic component, or the frequency of the harmonic component is between the first resonance frequency and the second resonance frequency.

4. The field winding type rotating electric machine as set forth in claim 1, wherein the rotor field winding has a plurality of field winding sections connected in series with each other,
   the capacitor comprises a plurality of capacitor units each of which has one end connected to the one end of the rectifying element and the other end connected to a corresponding one of junction points between the field winding sections,
   there are a plurality of resonant circuits formed of the plurality of field winding sections and the plurality of capacitor units, and
   at least one of resonance frequencies of the resonant circuits is within a predetermined frequency range which includes the frequency of the harmonic component, or the frequency of the harmonic component is between any two of the resonance frequencies of the resonant circuits.

5. The field winding type rotating electric machine as set forth in claim 4, wherein the resonance frequencies of the resonant circuits are different from each other.

6. The field winding type rotating electric machine as set forth in claim 1, wherein from low rotation to high rotation, the frequency of the harmonic component superimposed on the fundamental component is within a predetermined frequency range that includes a resonance frequency based on the inductance of the rotor field winding and the capacitance of the capacitor.

7. The field winding type rotating electric machine as set forth in claim 6, wherein the predetermined frequency range is a range within which the excitation current induced in the rotor field winding or the rotational torque is higher than or equal to a predetermined value.

8. The field winding type rotating electric machine as set forth in claim 6, wherein the stator armature winding includes phase windings of three phases, and
   in inducing the excitation current in the rotor field winding in a rectangular-wave control region, the control circuit is configured to:
   add a first negative voltage pulse, at a timing delayed by 30°-60° in electrical angle from a center of an ON duration of a waveform of a rectangular-wave voltage for generating the fundamental component applied to the phase winding of one of the three phases, to turn off for a predetermined duration during an ON duration of a waveform of a rectangular-wave voltage for generating the fundamental component applied to the phase winding of one of the remaining two phases while adding a first positive voltage pulse, which is a counterpart of the first negative voltage pulse, to turn on for a predetermined duration during an OFF duration of a waveform of a rectangular-wave voltage for generating the fundamental component applied to the phase winding of the other of the remaining two phases; or
   add a second positive voltage pulse, at a timing delayed by 30°-60° in electrical angle from a center of an OFF duration of a waveform of a rectangular-wave voltage for generating the fundamental component applied to the phase winding of one of the three phases, to turn on for a predetermined duration during an OFF duration of a waveform of a rectangular-wave voltage for generating the fundamental component applied to the phase winding of one of the remaining two phases while adding a second negative voltage pulse, which is a counterpart of the second positive voltage pulse, to turn off for a predetermined duration during an ON duration of a waveform of a rectangular-wave voltage for generating the fundamental component applied to the phase winding of the other of the remaining two phases.

9. The field winding type rotating electric machine as set forth in claim 8, wherein the control circuit is configured to:
   perform excitation via the rotor field winding six times at equal intervals during each control cycle by performing both the addition of the first negative voltage pulse and the first positive voltage pulse and the addition of the second positive voltage pulse and the second negative voltage pulse with the one of the three phases as a reference phase also for each of cases where either of the remaining two phases is a reference phase; or perform excitation via the rotor field winding three times at equal intervals during each control cycle by performing either of the addition of the first negative voltage pulse and the first positive voltage pulse and the addition of the second positive voltage pulse and the second negative voltage pulse with the one of the three phases as a reference phase also for each of cases where either of the remaining two phases is a reference phase.

10. The field winding type rotating electric machine as set forth in claim 8, wherein in inducing the excitation current in the rotor field winding in the rectangular-wave control region, the control circuit is configured to add pairs of positive and negative voltage pulses to the waveforms of the rectangular-wave voltages, which are for generating the fundamental components applied to two phase windings that are circumferentially adjacent to each other, four times at equal intervals during each control cycle so as to make an average value of the applied voltage to each phase during each control cycle zero.

11. The field winding type rotating electric machine as set forth in claim 8, wherein the frequency of adding the voltage pulses by the control circuit is within the predetermined frequency range.

12. The field winding type rotating electric machine as set forth in claim 6, wherein the stator armature winding includes phase windings of three phases, and in inducing the excitation current in the rotor field winding in a rectangular-wave control region, the control circuit is configured to perform a first harmonic-wave generation process of:

adding a first negative voltage pulse, at the start of an ON duration of a waveform of a rectangular-wave voltage for generating the fundamental component applied to the phase winding of one of the three phases, to turn off for a predetermined duration while adding a first positive voltage pulse, which is a counterpart of the first negative voltage pulse, to turn on for a predetermined duration during an OFF duration of a waveform of a rectangular-wave voltage for generating the fundamental component applied to the phase winding of either of the remaining two phases; or adding a second positive voltage pulse, at the end of an ON duration of a waveform of a rectangular-wave voltage for generating the fundamental component applied to the phase winding of one of the three phases, to extend the ON duration by a predetermined duration while adding a second negative voltage pulse, which is a counterpart of the second positive voltage pulse, to turn off for a predetermined duration during an ON duration of a waveform of a rectangular-wave voltage for generating the fundamental component applied to the phase winding of either of the remaining two phases.

13. The field winding type rotating electric machine as set forth in claim 12, wherein the control circuit is configured to perform excitation via the rotor field winding six times at equal intervals during each control cycle by performing the first harmonic-wave generation process at both the timings of the start and the end of the ON duration of the waveform of the rectangular-wave voltage for each of the phase windings of the three phases.

14. The field winding type rotating electric machine as set forth in claim 12, wherein the control circuit is configured to perform excitation via the rotor field winding three times at equal intervals during each control cycle by performing the first harmonic-wave generation process at either of the timings of the start and the end of the ON duration of the waveform of the rectangular-wave voltage for each of the phase windings of the three phases.

15. The field winding type rotating electric machine as set forth in claim 12, wherein in inducing the excitation current in the rotor field winding in the rectangular-wave control region, the control circuit is configured to add pairs of positive and negative voltage pulses to the waveforms of the rectangular-wave voltages, which are for generating the fundamental components applied to two phase windings that are circumferentially adjacent to each other, four times at equal intervals during each control cycle so as to make an average value of the applied voltage to each phase during each control cycle zero.

16. The field winding type rotating electric machine as set forth in claim 12, wherein the control circuit is configured to perform excitation via the rotor field winding four times at equal intervals during each control cycle by performing a second harmonic-wave generation process while performing the first harmonic-wave generation process at both the timings of the start and the end of the ON duration of the waveform of the rectangular-wave voltage for a predetermined phase winding, the second harmonic-wave generation process being a process of adding pairs of positive and negative voltage pulses, at two timings that are offset by 90° in electrical angle respectively from the timings of the start and the end of the ON duration of the waveform of the rectangular-wave voltage for the predetermined phase winding, to the waveforms of the rectangular-wave voltages for generating the fundamental components applied to two phase windings that are circumferentially adjacent to each other.

17. The field winding type rotating electric machine as set forth in claim 12, wherein the frequency of adding the voltage pulses by the control circuit is within the predetermined frequency range.

\* \* \* \* \*